(12) United States Patent
Suwa et al.

(10) Patent No.: US 11,513,263 B2
(45) Date of Patent: Nov. 29, 2022

(54) LIGHT-DIFFUSER, LIGHT DIFFUSING ADHESIVE, LIGHT DIFFUSING HARD COAT MEMBER, LIGHT DIFFUSION FILM, AND IMAGE FORMING APPARATUS INCLUDING LIGHT DIFFUSION FILM

(71) Applicant: SAMSUNG ELECTRONICS CO., LTD., Suwon-si (KR)

(72) Inventors: Tatsuhiro Suwa, Yokohama (JP); Yoshihiro Yokote, Yokohama (JP); Yuji Tanaka, Yokohama (JP)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 227 days.

(21) Appl. No.: 15/931,683

(22) Filed: May 14, 2020

(65) Prior Publication Data
US 2020/0363570 A1    Nov. 19, 2020

(30) Foreign Application Priority Data

May 15, 2019  (JP) .............................. JP2019-092404
Sep. 27, 2019  (JP) .............................. JP2019-177308
Jan. 28, 2020  (KR) ........................ 10-2020-0010075

(51) Int. Cl.
*G02B 5/02*  (2006.01)
*G02B 1/04*  (2006.01)
*G06F 1/16*  (2006.01)
*G02F 1/1335*  (2006.01)

(52) U.S. Cl.
CPC ............. *G02B 5/0257* (2013.01); *G02B 1/04* (2013.01); *G02B 5/0278* (2013.01); *G02F 1/133504* (2013.01); *G06F 1/1609* (2013.01)

(58) Field of Classification Search
CPC ...... G02B 5/0257; G02B 1/04; G02B 5/0278; G02F 1/133504; G02F 2202/36; G06F 1/1609
See application file for complete search history.

(56) References Cited

U.S. PATENT DOCUMENTS 7,138,161 B2 * 11/2006 Noguchi .................... C08J 3/12
                                                                428/404
8,268,441 B2    9/2012 Kim et al.
(Continued)

FOREIGN PATENT DOCUMENTS

CN    103797385 B  *  3/2017  ............... G02B 1/10
JP    2-120702 A        5/1990
(Continued)

OTHER PUBLICATIONS

International Search Report and Written Opinion dated Sep. 11, 2020 issued by the International Searching Authority in International Patent Application No. PCT/KR2020/006326. (PCT/ISA/210/220/237).

(Continued)

*Primary Examiner* — Ellen E Kim
(74) *Attorney, Agent, or Firm* — Sughrue Mion, PLLC

(57) ABSTRACT

A light-diffuser includes a transparent resin and transparent particles dispersed in the transparent resin. The transparent resin has a refractive index different from that of the transparent particles, and at least one portion of an outer perimeter of each of the transparent particles, respectively, is made compatible with the transparent resin disposed in the vicinity of the transparent particles, respectively.

20 Claims, 14 Drawing Sheets

(56) References Cited

U.S. PATENT DOCUMENTS

| | | |
|---|---|---|
| 9,417,364 B2 | 8/2016 | Nakamura et al. |
| 2003/0002153 A1* | 1/2003 | Hiraishi ............... G02B 5/0242 359/452 |
| 2003/0081313 A1 | 5/2003 | Hiraishi et al. |
| 2003/0156238 A1 | 8/2003 | Hiraishi et al. |
| 2004/0030081 A1 | 2/2004 | Hegi et al. |
| 2004/0196648 A1 | 10/2004 | Franklin et al. |
| 2013/0300980 A1 | 11/2013 | Nishimura et al. |
| 2014/0177060 A1* | 6/2014 | Furui ....................... G02B 1/10 427/164 |
| 2017/0205701 A1* | 7/2017 | Ide ........................ G02B 5/0242 |
| 2018/0004018 A1 | 1/2018 | Oron et al. |

FOREIGN PATENT DOCUMENTS

| | | | |
|---|---|---|---|
| JP | 2003-262710 A | 9/2003 | |
| JP | 3545447 B2 | 7/2004 | |
| JP | 2007-133173 A | 5/2007 | |
| JP | 2008-233842 A | 10/2008 | |
| JP | 2010-44319 A | 2/2010 | |
| JP | 4890768 B2 | 3/2012 | |
| JP | 2012-83744 A | 4/2012 | |
| JP | 2015-45767 A | 3/2015 | |
| JP | 2019-184840 A | 10/2019 | |
| KR | 10-2004-0075999 A | 8/2004 | |
| KR | 10-2007-0087750 A | 8/2007 | |
| KR | 10-2015-0007153 A | 1/2015 | |
| KR | 20170125700 A * | 11/2017 | ........... H01L 33/501 |
| WO | 2007/043847 A1 | 4/2007 | |

OTHER PUBLICATIONS

Communication dated Mar. 22, 2022, issued by the European Patent Office in European Application No. 20806714.0.

* cited by examiner

LIGHT-DIFFUSER, LIGHT DIFFUSING ADHESIVE, LIGHT DIFFUSING HARD COAT MEMBER, LIGHT DIFFUSION FILM, AND IMAGE FORMING APPARATUS INCLUDING LIGHT DIFFUSION FILM

CROSS-REFERENCE TO RELATED APPLICATIONS

This application is based on and claims priority under 35 U.S.C. § 119 to Japanese Patent Application No. 2019-092404, filed on May 15, 2019, and Japanese Patent Application No. 2019-177308, filed on Sep. 27, 2019, in the Japan Patent Office, and Korean Patent Application No. 10-2020-0010075, filed on Jan. 28, 2020, in the Korean Intellectual Property Office, the disclosures of which are incorporated by reference herein in their entireties.

BACKGROUND

1. Field

The disclosure relates to a light-diffuser, a light diffusing adhesive, a light diffusing hard coat member, a light diffusion film including the same, and an image forming apparatus including the light diffusion film.

2. Description of Related Art

One of the methods of imparting light diffusivity to a transparent material is a method of dispersing a light diffusing agent, e.g., fine particles of a white pigment such as titanium oxide or an inorganic transparent material such as calcium carbonate, glass fine particles, and transparent polymer fine particles, in an island form in a transparent material. Light-diffusers obtained as described above have been used for various purposes in lighting covers, screens of projection televisions, surface emitting devices having uniform brightness, and the like.

A light-diffuser refracts light at an interface between a transparent material and a light diffusing agent by a refractive index difference therebetween and diffuses the refracted light forward. Thus, light is partially reflected by the refractive index difference and also partially diffused in a direction opposite to the proceeding direction of light. Recently, in terms of energy saving or enhancement of functions, a research has been done to develop a light-diffuser capable of improving light diffusion in the proceeding direction of incident light and inhibiting light diffusion in a direction opposite to the proceeding direction, i.e., backscattering.

As a related art technique of inhibiting backscattering of a light-diffuser, Japanese Patent Publication No. 2003-262710 discloses a light-diffuser, wherein a difference between higher and lowest refractive indices ($\Delta n$) and a refractive index difference between two random points spaced apart from each other at an interval of 500 Å are within a predefined range, and an average refractive index within any circle having a diameter of 5 mm is almost the same as an average refractive index of the entire area. Japanese Patent Publication No. 2003-262710 also discloses transparent particles used as a light diffusing agent and obtained by impregnating, with a polymerization initiator, radical-polymerizable monomers that form a polymers having a refractive index difference of 0.005 or more within transparent polymer particles having a uniform refractive index, and polymerizing the monomers. That is, the particles, in which the refractive index almost continuously changes from the center to the outer layer, are uniformly dispersed in a transparent polymer having a refractive index almost the same as that of the outermost portions of the particles. According to this technique, the refractive index continuously changes at the interface with a transparent polymer formed of two or more components having different refractive indices. As described above, according to the technique disclosed in Japanese Patent Publication No. 2003-262710, the refractive index difference at an interface between the transparent material and the light diffusing agent is reduced, thereby inhibiting backscattering. However, according to Japanese Patent Publication No. 2003-262710, when there is a slight refractive index difference between the particles and the transparent polymer, backscattering may occur. Thus, it is difficult to sufficiently inhibit backscattering by the light diffusion element including the particles

SUMMARY

Provided is a light-diffuser in which backscattering is sufficiently inhibited.

Additional aspects will be set forth in part in the description which follows and, in part, will be apparent from the description, or may be learned by practice of the presented embodiments.

According to an aspect of an example embodiment, there is provided a light-diffuser including: a transparent resin; and transparent particles dispersed in the transparent resin, wherein the transparent resin has a refractive index that is different from a refractive index of the transparent particles, and at least one portion of an outer perimeter of each of the transparent particles is compatibilized with the transparent resin disposed in a vicinity of each of the transparent particles, respectively.

The transparent particles may include transparent cross-linked resin particles.

The transparent particles may include at least one selected from a (meth)acrylic (co)polymer, a styrene-based (co)polymer, and a copolymer of a monomer including a (meth)acrylic monomer and a styrene-based monomer.

An average diameter of primary particles of the transparent particles may be in a range of 500 nm to 50 µm.

The transparent particles may include anisotropic particles.

The anisotropic particles may be aligned such that major axis directions thereof are oriented in approximately one direction.

An amount of the transparent particles may be in a range from 1 part by mass to 300 parts by mass, based on 100 parts by mass of the transparent resin.

The transparent resin may include a thermoplastic resin selected from a cellulose-based polymer, a vinyl-based polymer, a (meth)acrylic polymer, a polystyrene-based polymer, a polyester-based polymer, or a polycarbonate-based polymer.

The transparent resin may include a cured product of a resin precursor compound selected from a (meth)acrylic compound, an urethane-based compound, and an epoxy-based compound, wherein the (meth)acrylic compound contains two or more (meth)acryloyloxy groups.

A glass transition temperature (Tg) of the transparent resin may be in a range of −60° C. to 200° C.

The refractive index of the transparent resin may be in a range of 1.35 to 1.8.

A refractive index difference between the transparent particles and the transparent resin, respectively, may be in a range of 0.15 to 0.4.

A refractive index gradient may exist among a refractive index n1 of each of the transparent particles, a refractive index n2 of the transparent resin, and a refractive index nM of surfaces of the transparent particles, respectively, and the surfaces are included in the at least one portion of the outer perimeter where the transparent particles and the transparent resin are in a compatibilized state.

The refractive index n1 of each of the transparent particles, the refractive index n2 of the transparent resin, and the refractive index nM of the surfaces of the transparent particles in the compatibilized state with the transparent resin may satisfy a relationship n2<nM<n1.

The transparent resin may be an adhesive.

The transparent resin may be a hard-coating resin.

In accordance with an aspect of the disclosure, there is provided a light diffusion film including at least one selected from: a light diffusion layer formed of the light-diffuser, an adhesive layer formed of the light-diffuser, wherein the transparent resin is an adhesive, and a hard coat layer formed of the light-diffuser, wherein the transparent resin is a hard-coating resin.

A thickness of the light diffusion film may be in a range from 1 μm to 500 μm.

The light diffusion film may further include a substrate that includes a resin film including at least one selected from a cellulose-based polymer, a polyester-based polymer, and a (meth)acrylic polymer.

In accordance with an aspect of the disclosure, there is provided a display device including the light diffusion film.

In accordance with an aspect of the disclosure, there is provided a method of producing a light-diffuser, the method including: dispersing transparent particles in a transparent resin; treating the transparent particles and the transparent resin with a solvent so that some particles of the transparent resin infiltrate a portion of an outer periphery of each of the transparent particles to blur an interface between the transparent resin and each of the transparent particles, respectively, the portion extending from the interface toward a center of each of the transparent particles; and producing the light-diffuser including the transparent resin in which the transparent particles are dispersed, wherein the portion of the outer periphery of each of the transparent particles remains mixed with the some particles of the transparent resin, thereby preventing backscattering, wherein the transparent resin has a refractive index different from that of the transparent particles.

A refractive index n1 of a center portion of each of the transparent particles, a refractive index n2 of the transparent resin, and a refractive index nM of the portion of the outer periphery of each of the transparent particles, respectively, may satisfy a relationship n2<nM<n1, and the center portion is exclusive of the portion of the transparent particles that is infiltrated with the some particles of the transparent resin.

An average diameter of primary particles of the transparent particles may be in a range of 500 nm to 50 μm.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1A:
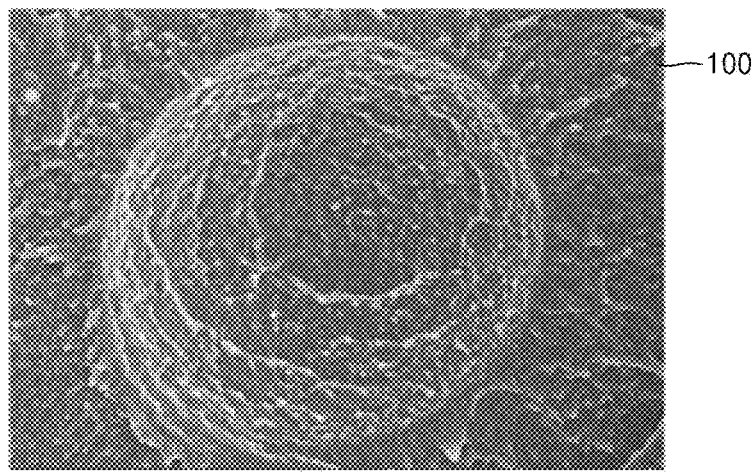
FIG. 1A is a scanning electron microscope (SEM) image of a cross-section of a light diffusion film sample 1-1 according to Example 1 of an embodiment in a thickness direction, illustrating an enlarged view of one transparent particle and a surrounding area thereof.

Hereinafter, embodiments will be described in detail. The embodiments described below allow for various changes and numerous embodiments, certain embodiments will be illustrated in the drawings and described in detail in the written description. However, this is not limiting to particular examples of practice, and it is to be appreciated that all modifications, equivalents, and substitutes that do not depart from the spirit and technical scope of embodiments are encompassed in embodiments.

Throughout embodiments, the expression "at least one of a, b or c" indicates only a, only b, only c, both a and b, both a and c, both b and c, all of a, b, and c, or variations thereof.

All terms used in embodiments are merely used to describe particular embodiments, and are not intended to limit embodiments. An expression used in the singular encompasses the expression of the plural, unless it has a clearly different meaning in the context. As used herein, it is to be understood that the terms such as "include", "have", or the like, are intended to indicate the existence of the features, numbers, operations, components, parts, elements, materials, or combinations thereof disclosed in the specification, and are not intended to preclude the possibility that one or more other features, numbers, operations, components, parts, elements, materials, or combinations thereof may exist or may be added. As used herein, the "/" may be interpreted as either "and" or "or" depending on situations.

In the drawings, thicknesses of layers and regions may be enlarged or reduced for clarity. Throughout the specification, like reference numerals denote like elements. Throughout the specification, it will be understood that when one element such as layer, region, or plate, is referred to as being "on" another element, it can be directly on the other element, or intervening elements may also be present therebetween. It will be understood that, although the terms first, second, etc. may be used herein to describe various components, these components should not be limited by these terms. These terms are only used to distinguish one component from another. Although some of the components may be omitted in the drawings, this is intended to aid in better understanding of embodiments, not to preclude the omitted components.

Hereinafter, embodiments will be described. Also, unless otherwise defined, manipulation is performed and physical properties, and the like are measured at room temperature (from 20° C. to 25° C.)/relative humidity of 40% RH to 60% RH.

Also, as used herein, the term "(meth)acrylate" is a generic name for acrylate and methacrylate. The name of a compound including (meth) such as (meth)acrylic acid is also a generic name for compounds with "meth" included in the name thereof and compounds with no "meth" included in the name thereof.

Also, as used herein, the term "(co)polymer" is a generic name for homo polymers and copolymers.

In addition, as used herein, the term "compatibilization" means that a plurality of components, e.g., resins or compounds, generally immiscible with each other are mixed by mutual dissolving.

As used herein, the term "mixed by mutual dissolving" does not necessarily means that the compounds are in liquid states, but generally means that, for example, a plurality of solid resins immiscible with each other are "mutually mixed on a molecular or segment scale".

For example, an outer perimeter portion of a transparent particle and the transparent resin are respectively dissolved in a solvent and the transparent resin dissolved in the solvent infiltrates into the outer perimeter portion of the transparent particle. The transparent resin infiltrated into the outer perimeter portion of the transparent particle remains even after the solvent is removed and dried, and thus a state in which the outer perimeter portion of the transparent particle and the transparent resin are mixed by mutual dissolving is provided. That is, the outer perimeter portion of the transparent particle and the transparent resin are mixed on a molecular and/or segment scale. For example, the outer perimeter portion of the transparent particle and the transparent resin are mixed on a molecular and/or segment scale without chemical reaction such as polymerization. Based on the term defined in embodiments, the outer perimeter portion of the transparent particle and the transparent resin are compatibilized with each other. As a result, the transparent particle and the transparent resin are modified such that an interface therebetween is not clearly distinguished.

As used herein, the term "compatible" refers to a "compatibilized state".

As used herein, the term "incompatible" refers to an "incompatibilized state".

Throughout the specification, the term "outer perimeter" or "outer perimeter portion" of the transparent particle refers to a "surface" or a "surface and a portion adjacent to the surface" of the transparent particle. The portion adjacent to the surface refers to a portion within, for example, 5% or less, 4% or less, 3% or less, 2% or less, 1% or less, 0.5% or less, 0.3% or less, or 0.1% or less with respect to a distance from the surface (as a non-limiting example, from the outer perimeter of the transparent particle before the compatibilized state) to the center of the transparent particle.

In addition, as used herein, the term "transparent" object refers to an object having a low haze, i.e., in a state where the opposite side of the object is visible because part or all of visible light is not scattered in the object but passes through the object.

Light-Diffuser

According to an embodiment, a light-diffuser includes transparent particles and a transparent resin, as a binder. The transparent particles are dispersed in the transparent resin, the transparent resin has a refractive index different from that of the transparent particles, and the transparent particles and the transparent resin are in a compatible state where only outer perimeter portions of the transparent particles are compatibilized with the transparent resin disposed in the vicinity of the transparent particles. According to embodiments, backscattering may sufficiently be inhibited in the light-diffuser. The vicinity of the transparent particles may mean a portion of the transparent resin adjacent to the surface of transparent particles within, for example, 5% or less, 4% or less, 3% or less, 2% or less, 1% or less, 0.5% or less, 0.3% or less, or 0.1% or less with respect to a distance from the surface into the adjacent transparent resin (as a non-limiting example, from the outer perimeter of the transparent particle before the compatibilized state).

Also, in the light-diffuser according to an embodiment, at least one portion of the outer perimeter portion of each transparent particle is compatibilized with the transparent resin disposed in the vicinity of the transparent particle.

The Fresnel reflection occurs when light is incident on an interface between two materials having different refractive indices. However, when a difference in the refractive index is less than a wavelength of incident light, Fresnel reflection does not occur. That is, Fresnel reflection does not occur when the refractive index is continuously changed at the interface between the light diffusing agent and the transparent resin contained in the light-diffuser. Thus, diffusion of light in a direction opposite to a proceeding direction of light, i.e., backscattering, may be inhibited.

According to the related art method using transparent particles, a light-diffuser includes transparent polymer particles, as a light diffusing agent, in which the refractive index changes continuously from the center of each particle to an outer layer thereof. In addition, the particles are dispersed in a transparent polymer having almost the same refractive index as that of an outermost portion of the particle. However, different materials usually have different refractive indices, and, thus, it is difficult to adjust the refractive index of the outermost portion of the particle to be identical to the refractive index of the transparent polymer constituting the binder. Therefore, backscattering cannot be sufficiently inhibited by the light-diffuser. However, in the light-diffuser according to an embodiment, only the outer perimeter portion of each transparent particle used as a light diffusing agent is in a compatible state with the transparent resin constituting the binder disposed in the vicinity of the transparent particle. Accordingly, the refractive index may be continuously changed at the interface between the transparent particle and the transparent resin, thereby sufficiently inhibiting backscattering.

In addition, the use of transparent particles according to the related art may cause problems such as necessity of preparing particles having a particular configuration, low productivity, and high cost. Also, it is very difficult to adjust the refractive index of the outermost portion of the particle to be almost identical to the refractive index of the transparent resin, there is not too much option for materials, and application field thereof is narrow. However, the light-diffuser according to an embodiment does not necessarily use particles having a particular configuration, and the effect on inhibiting backscattering is hardly affected by the refractive indices of the transparent particles or the transparent resin. Thus, the light-diffuser according to an embodiment may be used in a wide application field due to high productivity, low cost, and many options for materials.

The refractive index of the transparent particle may be determined by a dispersion method using a refractive liquid, and the refractive index of the transparent resin may be determined by the above-described dispersion method or by using an Abbe refractometer. In addition, experimental methods therefor will be described in detail in examples below.

By observing a cross-section of the light-diffuser using a SEM, it may be identified whether only the outer perimeter portion of the transparent particle and the transparent resin in the vicinity of the transparent particle are in a compatible state. When fine irregularities are identified on the surface of the transparent particle and the interface between the transparent resin of the binder and the transparent particle is not clearly distinguished in a SEM image of the cross-section of the light-diffuser, it may be determined that the interface is in a compatible state. In addition, when the surface of the transparent particle is smooth and when the interface between the transparent resin of the binder and the transparent particle is clearly distinguished in a SEM image of the light-diffuser, it may be determined that the interface in an incompatible state. In addition, experimental methods therefor will be described in detail in examples below.

Hereinafter, components constituting the light-diffuser an embodiment will be described in detail.

Transparent Particles

The light-diffuser according to an embodiment includes transparent particles. In addition, the transparent particles are dispersed in a binder. In addition, the transparent particles and the transparent resin constituting the binder and to be described below are present in a state where only the outer perimeter portions of the transparent particles and the transparent resin in the vicinity of the transparent particles are in a compatible state. The transparent particles serve to refract light by using a refractive index difference with the transparent resin to diffuse the light forward.

The transparent particles are not particularly limited as long as only the outer perimeter portions thereof and the transparent resin in the vicinity of the transparent particles are in a compatible state, and any ones of the related art may be used. Among them, transparent resin particles (transparent polymer particles) may be used. Only the outer perimeter portions of the transparent particles may be compatibilized with the transparent resin in the vicinity of the transparent particles by dispersing the transparent resin and the transparent resin particles in a solvent and removing the solvent.

A resin constituting the transparent resin particles is not particularly limited and any ones of the related art may be used. Among them, the resin may include at least one selected from a (meth)acrylic (co)polymer ((meth)acrylic polymer), a styrene-based (co)polymer (styrene-based polymer), and a copolymer of a monomer including a (meth) acrylic monomer and a styrene-based monomer. The copolymer of a monomer including a (meth)acrylic monomer and a styrene-based monomer is not particularly limited, but may be a copolymer of a (meth)acrylic monomer and a styrene-based monomer. In addition, the transparent resin particles may include a single resin or a combination of at least two resins.

Throughout the specification, the (meth)acrylic (co)polymer refers to a (co)polymer of a compound containing a substituted or unsubstituted (meth)acryloyl group. In addition, the styrene-based (co)polymer refers to a (co)polymer of a compound containing a substituted or unsubstituted styryl group. The (meth)acryloyl group-containing compound may be, for example, a (meth)acrylic acid ester compound ((meth)acrylate compound).

In addition, the transparent resin particles may be, for example, transparent cross-linked resin particles. The transparent cross-linked resin particles are not particularly limited and any ones of the related art may be used. Among them, as the particles including the resin, for example, cross-linked (meth)acrylic polymer particles, cross-linked styrene-based polymer particles, and cross-linked styrene-(meth)acrylic polymer particles may be used. Also, for example, cross-linked methacrylate-based polymer particles and cross-linked styrene-methacrylate-based polymer particles may be used. In addition, particularly, cross-linked methyl methacrylate-based polymer particles and cross-linked styrene-methylmethacrylate-based polymer particles may be used.

The degree of cross-linking of the transparent cross-linked resin particles may be adjusted by an amount of a cross-linking agent, which will be described below, added to prepare the transparent cross-linked resin particles. As the amount of the cross-linking agent increases, the degree of cross-linking is improved. In addition, as the degree of cross-linking increases, the transparent cross-linked resin particles have a lower solubility or degree of swelling with respect to a solvent or a transparent resin or a precursor thereof. Also, as the solubility or the degree of swelling decreases, compatibilization of the outer perimeter portion of each transparent cross-linked resin particle with the transparent resin in the vicinity of the transparent cross-linked resin particle becomes difficult. The degree of cross-linking of the transparent cross-linked resin particles may be low and the amount of the cross-linking agent may decrease in the preparation of the transparent cross-linked resin particles. Meanwhile, the degree of cross-linking of the transparent cross-linked resin particles may be within a range in which the entire area of the transparent cross-linked resin particles are not completely compatibilized with the transparent resin. When the both are completely compatibilized, distribution of the refractive indices becomes uniform, and thus light cannot be refracted by the transparent cross-linked resin particles failing in proceeding forward.

The transparent resin particles may be obtained by suspension polymerization of a radical polymerizable monomer. The radical polymerizable monomer is not particularly limited, but may be for example, a vinyl monomer (e.g., a (meth)acrylate-based compound or a styrene-based compound). The vinyl monomer may be used alone or in a mixture of at least two thereof. However, when two or more types are mixed, they may be dissolved in each other. Also, the transparent cross-linked resin particles may be prepared by forming a cross-linking structure using the monomer and, when required, a multi-functional monomer (cross-linking agent) including two or more radical polymerizable functional groups per one molecule. The cross-linking agent is not particularly limited and any ones of the related art may be used. For example, a di-functional monomer such as (poly)ethylenegylcoldi(meth)acrylate, (poly)propylenegylcoldi(meth)acrylate, 1,4-butanedioldi(meth)acrylate, 1,6-hexanedioldi(meth)acrylate, allyl (meth)acrylate, allyl cinnamate, and divinylbenzene may be used. In addition, for example, a tri-functional monomer such as trimethylolpropane tri(meth)acrylate, triallyl trimellitate, and diallyl maleate may be used. Also, for example, a tetra-functional monomer such as pentaerythritol tetra(meth)acrylate may be used.

The shape of the transparent particles is not particularly limited and the transparent particles may be isotropic particles or anisotropic particles. The anisotropic particle refer to a particle having a major axis with a largest diameter in a direction where a cross-section of the particle is confirmed to have anisotropy and a minor axis having a smallest diameter.

In addition, when the transparent particles are anisotropic particles, the major axes of the transparent particles may be aligned approximately in one direction in the light-diffuser.

In addition, anisotropic particles may be particles having anisotropy from a raw material state or may be formed by cutting transparent fiber. Alternatively, anisotropic particles may be obtained from isotropic particles by stretching the light-diffuser including the isotropic particles and the transparent resin.

The transparent particles may be particles having a single-layered structure or particles having a multi-layered structure such as core-shell structure. Also, particles having refractive indices almost continuously changing from the center to the outer layer as disclosed in paragraphs 20 to 28 of Japanese Patent Publication No. 2003-262710 may be used. The disclosure of Japanese Patent Publication No. 2003-262710 is incorporated herein by reference.

The light-diffuser may be observed by using the SEM or the like to determine whether the transparent particles are anisotropic particles and whether the anisotropic particles are present in an aligned state.

In addition, the degree of anisotropy determined by the shapes of the transparent particles and alignment thereof may be identified based on measured results obtained by a Goniometer while changing a measurement axis of the light-diffuser. The degree of anisotropy may be determined by, for example, a difference between a measurement value of a varied-angle light intensity in a direction parallel to a stretching direction or a coating direction and a measurement value of a varied-angle light intensity in a direction perpendicular to the stretching direction or the coating direction. In addition, experimental methods therefor will be described in detail in examples below.

An average diameter of primary particles of the transparent particles is not particularly limited but may be 500 nm or more or 1.0 μm or more. In addition, for example, the average diameter is 1.5 μm or more. In addition, the average diameter of the primary particles of the transparent particles is not particularly limited but may be 50 μm or less or 20 μm or less. In addition, for example, the average diameter is 15 μm or less. The average diameter of the primary particles of the transparent particles is, for example, in the range of 500 nm to 50 μm, 1.0 μm to 20 μm, or 1.5 μm to 10 μm. When the average diameter of the primary particles of the transparent particles is within the ranges above, forward diffusivity of light is further improved. In this regard, when the transparent particles are anisotropic particles, the average diameter of the primary particles is determined as the largest diameter in the minor axis direction. In addition, the average diameter of the primary particles may be obtained by measuring particle diameters from SEM images and calculating an average thereof or may be obtained by measuring using a particle size distribution meter.

The transparent particles may be obtained by synthesis or from commercially available products. Although the commercially available products are not particularly limited, examples thereof may include Ganzpearl® GSM0561S-1 and GM0449S-2, and the like, manufactured by Aica Kogyo Co., Ltd.

The transparent particles may be used alone in combination of two or more types thereof.

An amount of the transparent particles contained in the light-diffuser may be, but is not limited to, 1 part by mass or more based on 100 parts by mass of the transparent resin contained in the light-diffuser. In addition, the amount of the transparent particles in the light-diffuser may be 5 parts by mass or more or 10 parts by mass of or more based on 100 parts by mass of the transparent resin in the light-diffuser. When the amount of the transparent particles is within the above-described ranges, the forward diffusivity of light is further improved. In addition, the amount of the transparent particles in the light-diffuser is not particularly limited but may be, for example, 300 parts by mass or less based on 100 parts by mass of the transparent resin in the light-diffuser. In addition, the amount of the transparent particles in the light-diffuser may be, for example, 200 parts by mass or less or 100 parts by mass or mass based on 100 parts by mass of the transparent resin in the light-diffuser. When the amount of the transparent particles is within the ranges above, forward scattering of light is further increased thereby decreasing backscattering. The amount of the transparent particles in the light-diffuser may be in the range of 1 part by mass to 300 parts by mass, 5 parts by mass to 200 parts by mass, or 10 parts by mass to 100 parts by mass based on 100 parts by mass of the transparent resin in the light-diffuser.

Here, the term "100 parts by mass of the transparent resin", as a criterion for determining the amount of the transparent particles in the light-diffuser, refers to 100 parts by mass of a thermoplastic resin, when the transparent resin is the thermoplastic resin which will be described below. Also, when the transparent resin is a curable resin which will be described below, the term "100 parts by mass of the transparent resin" refers to 100 parts by mass of a total mass of a curable resin, a resin precursor compound thereof that may be arbitrarily contained therein, and a hardener that may be arbitrarily contained therein and will be described below.

Transparent Resin

The light-diffuser according to an embodiment includes the transparent resin as a binder. In addition, in the light-diffuser, the above-described transparent particles and the transparent resin are present such that only the outer perimeter portions of the transparent particles and the transparent resin in the vicinity of the transparent particle are in a compatible state. The transparent resin constitutes the binder, holds the transparent particles, and transmits light forward.

The transparent resin is not particularly limited and any ones of the related art may be used. Types of the resin may include a thermoplastic resin, a curable resin, and the like. The curable resin may be a resin cured via curing reaction of a resin precursor compound such as a monomer, an oligomer, or a polymer (prepolymer). In addition, the curable resin may include a photocurable resin, a thermosetting resin (including a resin cured at a temperature below room temperature), and the like. As the transparent resin, any resin having optimal properties may be selected according to the use thereof Thermoplastic Resin The thermoplastic resin is not particularly limited and any ones of the related art may be used. For example, a cellulose-based polymer such as acetylcellulose and nitrocellulose may be used. In addition, for example, a vinyl-based polymer such as vinyl acetate and a copolymer thereof, vinyl chloride and a copolymer thereof, vinylidene chloride and a copolymer thereof may be used. In addition, for example, a (meth)acrylic polymer such as a (meth)acrylic (co)polymer, a polystyrene-based polymer, a copolymer of a (meth)acrylic monomer and another monomer, a polyester-based polymer, a polycarbonate-based polymer, and the like may be used.

A weight average of a molecular weight of the thermoplastic resin may be, for example, in the range of 10000 to 1000000, but is not limited thereto. In addition, the weight average of a molecular weight of the thermoplastic resin may be, for example, in the range of 20000 to 500000 or 50000 to 200000. The weight average of a molecular weight of the transparent resin may be measured by gel permeation chromatography (GPC) and calculated, for example, as a polystyrene-equivalent value.

Curable Resin

The curable resin is not particularly limited and any ones of the related art may be used. For example, the curable resin may be a cured product of a resin precursor compound such as a (meth)acrylic compound, a urethane-based compound, and an epoxy-based compound. These resin precursor compounds may be monomers, oligomers, or polymers (prepolymers). In addition, the resin precursor compound may a single compound or a combination of two or more different types of compounds.

The (meth)acrylic compound is not particularly limited as long as it is a compound containing two or more (meth)acryloyloxy groups in one molecule. Particularly, for example, a bi- to deca-functional (meth)acrylate may be used. Any known compounds may be used as the bi- to deca-functional (meth)acrylate. In addition, these compounds may be compounds modified by urethane modification, ethyleneoxide modification, propyleneoxide modification, and the like.

Examples of compound containing two or more (meth)acryloyloxy groups in one molecule may include urethane (meth)acrylate and polyester(meth)acrylate.

In addition, the resin precursor compound may be the above-described thermoplastic resin including a curable functional group or a derivative into which the functional group is introduced. Examples of the resin precursor compound may include a curable cellulose-based prepolymer.

The molecular weight of the resin precursor compound is not particularly limited. For the monomer, a sum of atomic weights of atoms constituting the monomer may be less than 1000. In addition, the oligomer may have a weight average molecular weight of 1000 or more and less than 10000. Also, the polymer (prepolymer) may have a weight average molecular weight of 10000 to 2000000. The weight average molecular weights of the oligomer and the prepolymer may be measured by GPC and calculated, for example, as a polystyrene-equivalent value.

A transparent resin may be appropriately selected to impart new functions to the light-diffuser in addition to light diffusivity required for a desired purpose. Examples of the transparent resin may include a resin for adhesive that provides adhesiveness to a layer formed of a cured product. Furthermore, for example, a resin for hard coat may be used to provide high hardness to a layer formed of a cured product. In addition, for example, a resin for ink allowing a composition including the resin to form a patterned resin layer may be used. The transparent resin may be, for example, the resin for adhesiveness, the resin for hard coat, or the resin for ink. That is, the transparent resin according to an embodiment may be a light diffusing adhesive formed of a light-diffuser including the resin for adhesive. In addition, the transparent resin according to an embodiment may be a light diffusing hard coat member formed of a light-diffuser including the resin for hard coat. In addition, the transparent resin according to an embodiment may be a light diffusing ink formed of a light-diffuser including the resin for ink. The transparent resin is not particularly limited but may be, for example, a curable resin. Examples of the resin for adhesive and the resin for hard coat may include cured products of a (meth)acrylic prepolymer. In addition, examples of the resin for adhesive may include a cured product of an acrylic prepolymer. Examples of the resin for hard coat may include a cured product of a methacrylic prepolymer and a methacrylate-based prepolymer. Examples of the resin for ink are not particularly limited, but may be a cellulose-based prepolymer such as acetylcellulose and nitrocellulose.

Throughout the specification, the (meth)acrylic (co)prepolymer may be a prepolymer of a (co)polymer of a substituted or unsubstituted (meth)acryloyl group-containing a compound. The (meth)acryloyl group-containing compound may be, for example, a (meth)acrylic acid ester compound ((meth)acrylate compound). That is, the (meth)acrylic (co) prepolymer may be, for example, a (meth)acrylic acid ester-based copolymer ((meth)acrylate-based copolymer).

Hardener

The light-diffuser according to an embodiment may further include a hardener. In addition, when the transparent resin included in the light-diffuser according to an embodiment is a curable resin, the curable resin may be obtained by curing the resin precursor compound using a hardener. The transparent resin (curable resin) has a partial structure derived from the hardener. The hardener serves to proceed polymerization or cross-linking of the resin precursor compound forming the curable resin.

The hardener is not particularly limited, as long as polymerization or cross-linking of the resin precursor compound takes place thereby. For example, the hardener may be an isocyanate-based hardener, a carbodiimide-based hardener, an oxazoline-based hardener, an epoxy-based hardener, and an aziridine-based hardener, or a peroxide. In addition to the (meth)acrylic compound that is a resin precursor compound, a multi-functional (meth)acrylic compound and a radical initiator may also be used in combination therewith. Here, the peroxide refers to any compounds having a peroxide structure "—O—O—" in the molecular structure thereof. Among them, the hardener may be, for example, an isocyanate-based hardener.

The isocyanate-based hardener is not particularly limited, and any known compound having an isocyanate group (isocyanate compound) may be used. The isocyanate-based hardener may be, for example, a di-functional isocyanate (compound having two isocyanate groups) or a tri- of higher functional isocyanate (compound having three or more isocyanate groups).

As the di-functional isocyanate, aliphatic diisocyanates, alicyclic diisocyanates, aromatic diisocyanates, carbodiimide-modified diisocyanates obtained by modifying the above diisocyanates, or polymer compounds having these diisocyanates at one end of a main chain, a side chain, or an end of a side chain may be used. The di-functional isocyanate may be, for example, hexamethylene diisocyanate (HMDI, e.g., 1,6-hexamethylene diisocyanate).

As the 3 tri- of higher functional isocyanate, an isocyanurate product of the di-functional isocyanate, an adduct product of the di-functional isocyanate, a biuret product obtained by trimerization of the di-functional isocyanate, a biuret product obtained by biuret modifying the di-functional isocyanate and a trivalent alcohol such as glycerin or trimethylolpropane, or a polymer compound having the di-functional isocyanate or an adduct, biuret, or isocyanurate product thereof at one end of a main chain, a side chain, or one end of a side chain may be used.

The hardener may be obtained by synthesis or from commercially available products. Although the commercially available products of the isocyanate-based hardener are not particularly limited, examples thereof may include Takenate® D-102 and Takenate® D-110N available from Mitsui Chemicals Inc., and Duranate® 24A-100, Duranate® TPA-100, and Duranate® TKA-100 available from Asahi Kasei Corporation.

The hardener may be used alone or in combination of two or more thereof.

When the hardener is used, the amount of the hardener in the light-diffuser is not particularly limited, but may be, for example, 0.1% by mass or more based on a total mass of the curable resin, the resin precursor compound that may be arbitrarily contained therein, and the hardener. In addition, the amount of the hardener may be, for example, 0.05% by mass or more or 0.1% by mass or more based on the total mass thereof. When the amount of the hardener is within the ranges above, a cross-linking structure is introduced into the transparent resin layer, thereby improving heat resistance. In addition, the amount of the hardener in the light-diffuser is not particularly limited but may be 20% by mass or less, 10% by mass or less, or 5% by mass or less based on the total mass of the curable resin, the resin precursor compound that may be arbitrarily contained therein, and the hardener. When the amount of the hardener is within the ranges above, the transparent resin does not have an excessive cross-linking structure, thereby increasing toughness. That is, cracks are less likely occur therein.

The "amount of the hardener" in the light-diffuser refers to a total amount of the hardener and an amount of a partial structure of the curable resin derived from the hardener in the light-diffuser.

The transparent resin may be obtained by synthesis or from commercially available products. Although the commercially available products of the transparent resin are not particularly limited, examples thereof may include SK-Dyne® 1435 that is a solution including an adhesive resin composition, manufactured by Soken Chemical & Engineering Co., Ltd., S-7187 that is a solution including a resin composition for hard coat, manufactured by Toyokemu Co., Ltd., and IRX-HF medium that is an ink for screen printing, manufactured by Teikoku Printing Inks Mfg. Co., Ltd.

The transparent resin has a refractive index different from that of the transparent particles. An absolute value of the refractive index difference between the transparent particles and the transparent resin is not particularly limited, but may be, for example, 0.4 or less or 0.25 or less. In addition, the absolute value of the difference may be 0.15 or less (lower limit: 0). Backscattering is further inhibited due to the refractive index difference within this range.

In addition, the refractive index of the transparent resin is not particularly limited, but may be 1.35 or more and 1.8 or less or 1.43 or more and 1.7 or less. In addition, the refractive index of the transparent resin may be, for example, 1.45 or more and 1.6 or less.

In addition, as described above, the refractive index of the transparent particle may be determined by a dispersion method using a refractive liquid, and the refractive index of the transparent resin may be determined by the above-described dispersion method or by using an Abbe refractometer. In addition, experimental methods therefor will be described in detail in examples below.

A glass transition temperature Tg of the transparent resin is not particularly limited, but may be, 200° C. or less or 150° C. or less. For example, the glass transition temperature Tg of the transparent resin may be 100° C. or less. When the glass transition temperature Tg is within the ranges, the transparent resin may be more appropriately used for hard coat or ink. In addition, a lower limit of the glass transition temperature Tg of the transparent resin is not particularly limited, but the glass transition temperature Tg may be −60° C. or higher to be applied to an adhesive. The glass transition temperature Tg of the transparent resin may be, for example, in the range of −60° C. to 200° C., −60° C. to 150° C., or −60° C. to 100° C. The glass transition temperature Tg may be measured using a differential scanning calorimeter (DSC) or a viscoelastic meter. In addition, experimental methods therefor will be described in detail in examples below.

The transparent resin may be used alone or in a mixture of at least two thereof.

The amount of the transparent resin in the light-diffuser is not particularly limited, but may be 10% by mass or more based on a total mass of the light-diffuser. In addition, the amount of the transparent resin may be, for example, 20% by mass or more or 50% by mass or more based on the total mass of the light-diffuser. When the amount of the transparent resin is within the ranges described above, transmittance of light is further increased, thereby further inhibiting backscattering. In addition, the amount of the transparent resin in the light-diffuser is not particularly limited, but may be, for example, less than 100% by mass, 90% by mass or less, or 80% by mass or less based on the total mass of the light-diffuser. When the amount of the transparent resin is within the range above, forward diffusivity of light is further improved.

When the transparent resin is the thermoplastic resin, the term "amount of the transparent resin" in the light-diffuser refers to an amount of the thermoplastic resin. In addition, when the transparent resin is the curable resin, the amount of the transparent resin refers to a total amount of the curable resin, a resin precursor compound thereof that may be arbitrarily contained therein, and a hardener that may be arbitrarily contained therein and will be described below.

The combination of the transparent particles and the transparent resin is not particularly limited, but may be performed such that the resin, i.e., (co)polymer, constituting the outer perimeter portions of the transparent particles and the (co)polymer constituting the transparent resin have a partial structure derived from the same monomer. Particularly, both the resin constituting the outer perimeter portions of the transparent particles and the transparent resin may have a partial structure derived from a (meth)acrylic monomer.

Other Components

The light-diffuser according to an embodiment may further include known additives as long as they do not impair the effects of embodiments. The additives are not particularly limited. For example, the light-diffuser may further include another binder resin (different from the transparent resin), a curing accelerator, a lithium salt, a filler, a softener, an anti-aging agent, a levelling agent, an anti-foaming agent, a plasticizer, a dye, a pigment, a surface treating agent, a fluorescent brightening agent, a dispersant, a lubricant, an antistatic agent, an antioxidant, a photostabilizer, a polymerization inhibitor, a UV absorbent, and the like.

Method of Preparing Light-Diffuser

The method of preparing a light-diffuser according to an embodiment is not particularly limited, but may be, for example, a method including a process of preparing a light-diffuser-forming coating solution by blending transparent particles, a transparent resin, and a solvent, when required, (coating solution preparation process), and a process of forming a light-diffuser by coating the light-diffuser-forming coating solution and drying the coating (light-diffuser formation process).

In the coating solution preparation process, the light-diffuser-forming coating solution may generally be obtained by blending the above-described components. A blending method is not particularly limited. In the preparation of the coating solution, another component such as a hardener may also be blended therewith. As the blending process, a method of blending all components at once; a method of blending the components while adding the components in sequence, or a method of blending some components and then blending the mixture with the other components may be used. After blending, the mixture may be stirred to obtain a more uniform mixture. The stirring may be performed until a uniform mixture is obtained by using a stirrer, when required. In addition, the stirring may be performed at room temperature, but may also be performed while heating, when required. In this regard, a stirring time is not particularly limited, but may be, for example, 10 minutes or more and 5 hours or less. In addition, when heating is performed, a temperature after heating is not particularly limited, but may be, for example, 30° C. or higher and 40° C. or lower.

The solvent is not particularly limited, but may be a solvent capable of swelling the transparent particles, capable of dissolving only the outer perimeter portions, (surfaces) of the transparent particles, or capable of dissolving the transparent resin or a resin precursor compound thereof. By using these solvent, backscattering is further inhibited. The reason is as follows. The solvent swells or dissolves only the outer perimeter portions of the transparent particles in the light-diffuser-forming coating solution. Subsequently, the transparent resin of the resin precursor compound infiltrates into the swollen or dissolved portions of the transparent particles. By evaporating the solvent thereafter, a state in which only the outer perimeter portions of the transparent particles are compatible with the transparent resin disposed in the vicinity of the transparent particles may easily be formed. For example, after evaporating the solvent, the transparent resin disposed in the vicinity of the transparent particles also may remain within the outer perimeter portions of the transparent particles thereby forming a compatible state with the transparent particles. The outer perimeter portions of the transparent particles that form the compatible state with the transparent resin may be, for example, a swollen layer, infiltrated layer, and/or impregnated layer by the solvent, the transparent resin, or the resin precursor compound thereof. The solvent may be an organic solvent. The organic solvent is not particularly limited and may be appropriately selected from any ones of the related art according to the types of the transparent particles and the transparent resin. Examples of the solvent may include toluene, ethyl acetate, butyl acetate, methyl ethyl ketone, hexane, acetone, cyclohexanone, 3-pentanone, acetonitrile, propionitrile, isobutylonitrile, valeronitrile, dimethylsulfoxide, and dimethylformamide. The organic solvent may be used alone or in a mixture of at least two thereof.

Figure 4:
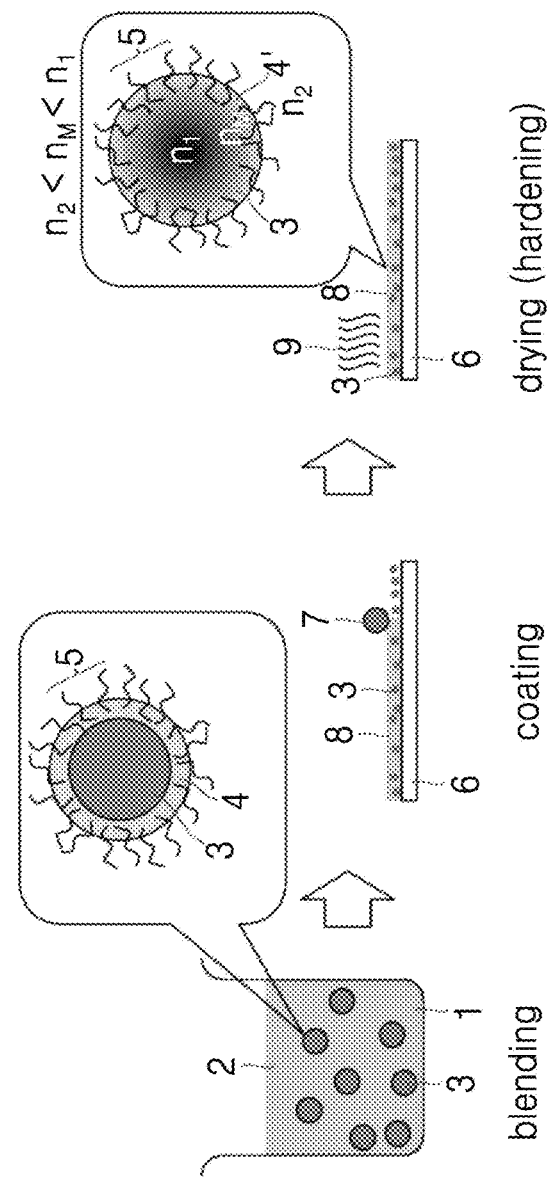
FIG. 4 is a schematic diagram illustrating an example of a method of preparing a light-diffuser according to an embodiment.

In this regard, an example of the method of preparing the light-diffuser according to an embodiment is shown in FIG. 4. First, according to the coating solution preparation process, a light-diffuser-forming coating solution 1 including transparent particles (e.g., cross-linked styrene-methacrylic polymer particles), a transparent resin (e.g., acrylic prepolymer), and a solvent (e.g., ethylacrylate) is prepared (See "blending" of FIG. 4). Here, the light-diffuser-forming coating solution 1 contains a liquid 2 including the solvent and transparent resin or a resin precursor compound dissolved in the solvent, and transparent particles 3. For example, swollen or dissolved surface portions 4 of the transparent particles are formed in the transparent particles contained in the light-diffuser-forming coating solution 1.

In addition, the transparent resin or the resin precursor compound 5 infiltrates into the swollen or dissolved surface portions 4 of the transparent particles. Thereafter, in the light-diffuser formation process, the light-diffuser-forming coating solution 1 is coated on a support 6 using a coating device 7 to form a coating film 8 (See "coating" of FIG. 4). Then, the coating film 8 is dried to evaporate and remove the solvent (evaporated solvent 9), and the coating film is further hardened, when required, to form a light-diffuser. As a result, the solvent is evaporated and removed from the swollen or dissolved surface portions 4 of the transparent particles 3, and the transparent resin or resin precursor compound 5 remains in the surface portions 4 of the transparent particles 3. In addition, when the coating film 8 is hardened, the resin precursor compound remaining in the surface portions 4 of the transparent particles 3 turns to the transparent resin. In addition, as a result, a refractive index gradient exists among a refractive index $n_1$ of each transparent particle, a refractive index $n_2$ of the transparent resin, and a refractive index $n_M$ of the surfaces portion 4' of the transparent particles 3 in the compatibilized state with the transparent resin after drying (hardening). The refractive index gradient may satisfy, for example, $n_2 > n_M > n_1$ or $n_2 < n_M < n_1$, particularly $n_2 < n_M < n_1$ (See "drying (hardening)" of FIG. 4). The refractive index $n_1$ of the transparent particle 3 may have a constant refractive index value in the transparent particle 3 except for the surface portion 4'. For example, a constant refractive index $n_1$ may be obtained without a refractive index gradient from a center of volume to the surface portions 4' in the transparent particle 3.

In addition, only the outer perimeter portion of the transparent particle is swollen or dissolved in the transparent resin or the resin precursor compound thereof and the transparent resin or the resin precursor compound thereof infiltrates into the swollen or dissolved portion of the transparent particle in light-diffuser-forming coating solution. Therefore, the compatible state is easily formed between only the outer perimeter portions of the transparent particles and the transparent resin disposed in the vicinity of the transparent particles. As a result, the light-diffuser-forming coating solution does not include the solvent and the backscattering is further inhibited.

In the preparation of the light-diffuser, the amount of the transparent particles is not particularly limited, but may be 1 part by mass or more based on 100 parts by mass of the transparent resin. In addition, the amount of the transparent particles may be, for example, 5 parts by mass or more or 10 parts by mass or more based on 100 parts by mass of the transparent resin. When the amount of the transparent particles is within the ranges above, forward diffusivity of light may further be increased. In addition, in the preparation of the light-diffuser, the amount of the transparent particles is not particularly limited, but may be 300 parts by mass or less based on 100 parts by mass of the transparent resin. In addition, the amount of the transparent particles may be, for example, 200 parts by mass or less or 100 parts by mass or less based on 100 parts by mass of the transparent resin. When the amount of the transparent particles is within the ranges above, transmittance of light is further increased, thereby further inhibiting backscattering.

The term "100 parts by mass of the transparent resin" used as a reference for the amount of the transparent particles in the preparation of the light-diffuser refers to 100 parts by mass of a thermoplastic resin when the transparent resin is the thermoplastic resin which will be described below. In addition, when the transparent resin is a curable resin which will be described below, the "100 parts by mass of the transparent resin" refers to 100 parts by mass of a total mass of the resin precursor compound forming a curable resin and a hardener that may be arbitrarily contained therein.

When the hardener is used, the amount of the hardener in the preparation of the light-diffuser is not particularly limited, but may be 0.01% by mass or more, 0.05% by mass or more, or 0.1% by mass based on the total mass of the resin precursor compound forming the curable resin and the hardener. When the amount of the hardener is within the ranges above, a cross-linking structure is introduced into the transparent resin layer, thereby further improving heat resistance. In addition, the amount of the hardener in the preparation of the light-diffuser is not particularly limited, but may be 20% by mass or less, 10% by mass or less, or 5% by mass or less based on the total mass the resin precursor compound forming the curable resin and the hardener. When the amount of the hardener is within the ranges above, the transparent resin layer does not have an excessive cross-linking structure, thereby further increasing toughness. That is, cracks are less likely occur therein.

A solid content in the light-diffuser-forming coating solution is not particularly limited, but may be in the range of 10% by mass to 100% by mass or 15% by mass to 100% by mass (upper limit: 100% by mass) based on the total mass of the light-diffuser-forming coating solution. When the solid content is within the ranges above, drying property is further improved and coating property is further improved when used as a coating solution.

In the light-diffuser formation process, a method of forming the light-diffuser is not particularly limited and any methods well known in the art may be used. Among them, for example, a method of coating the light-diffuser-forming coating solution on a support and drying a coated film formed thereon may be used. The drying method is not particularly limited and may be a heat-drying method.

The shape of the light-diffuser is not particularly limited but may have a layered-structure. In the case of the layered-structure, a thickness of the coating (thickness of a layer formed after coating) is not particularly limited but may be selected according to the use or types of the light-diffuser when used as a light diffusion film which will be described below. The light-diffuser having a layered-structure may have a thickness of 1 μm to 500 μm. In addition, the thickness of the light-diffuser having a layered-structure may be, for example, in the range of 10 μm to 300 μm or 15 μm to 150 μm.

A coating method is not particularly limited and any ones of the related art may be used. The coating may be performed using, for example, a doctor blade, a wire bar, a die coater, a comma coater, an applicator, and a gravure coater.

When the anisotropic particles are used as the transparent particles, the anisotropic particles may be aligned such that the major axis directions thereof are aligned in approximately one direction by shearing stress when the coating film is formed using the light-diffuser-forming coating solution.

A heat-drying temperature is not particularly limited. When the thermosetting resin is used as the transparent resin, the heat-drying temperature is not particularly limited as long as polymerization is sufficiently performed at the temperature. The heat-drying temperature may be, for example, in the range of 40° C. to 200° C., 50° C. to 180° C., or 60° C. to 150° C. A heat-drying time is not particularly limited. When the thermosetting resin is used as the transparent resin, the heat-drying time is not particularly limited as long as polymerization is sufficiently performed during the time. The heat-drying time may be, for example, in the range of 5 seconds to 180 minutes, 30 seconds to 120 minutes, or 1 minute to 60 minutes. When the heat-drying conditions are within the ranges above, the solvent may sufficiently be removed. In addition, when the thermosetting resin is used as the transparent resin, polymerization of an adhesive composition may appropriately be performed.

In addition, in the light-diffuser formation process, an aging process may further be performed after the coating and heat-drying processes.

When the photocurable resin is used as the transparent resin, the light-diffuser formation process may further include a light exposure process performed on the coating film, when required. Light used for the light exposure process is not particularly limited and may be appropriately selected according to the type of the transparent resin. Among types of light, for example, UV light, particularly, in a wavelength range of 200 $n_M$ to 400 $n_M$ may be used due to excellent controllability, ease of handling, and low costs. A light exposure device is not particularly limited and any ones of the related art may be used. In the case of UV exposure, for example, a metal halide lamp, a high-pressure mercury lamp, a UV-LED lamp, a low-pressure mercury lamp, a xenon arc lamp, a carbon arc lamp, an excimer lamp, or a UV laser may be used. The amount of energy used for the light exposure is not particularly limited. In the case of UV exposure, the amount of energy may be, for example, in the range of 50 $mJ/cm^2$ to 5000 $mJ/cm^2$.

In addition, when polymerization or cross-linking of the transparent resin proceeds by the light exposure, preparation and storage of the light-diffuser-forming coating solution and storage of the light-diffuser may be performed in an environment where light having a wavelength causing these phenomena is blocked.

When anisotropic particles are used as the transparent particles, the method of preparing the light-diffuser according to an embodiment may further include a stretching process of stretching the obtained light-diffuser, which is not stretched, in addition to the coating solution preparation process and the light-diffuser formation process. By performing the stretching process, the anisotropic particles may be more efficiently aligned such that the major axis directions thereof are aligned in approximately one direction.

A stretching method is not particularly limited and may be appropriately selected from ones of the related art. For example, the stretching method may be performed by free-end uniaxial stretching, fixed-end uniaxial stretching, simultaneous biaxial stretching, or sequential biaxial stretching. In addition, a combination of at least two thereof may be used.

A stretching magnification is not particularly limited as long as the anisotropic particles are aligned thereby. The stretching magnification may be, for example, in the range of 1% to 1000%, 5% to 500%, or 100% to 300%. A stretching temperature is not particularly limited as long as anisotropic particles are aligned and may be appropriately selected according to types of the transparent resin and the transparent particles. The stretching temperature may be, for example, in the range of 80° C. to 250° C., 100° C. to 200° C., or 120° C. to 180° C.

Use of Light-Diffuser

Use of the light-diffuser is not particularly limited. The light-diffuser may be used as an adhesive layer, a hard coat layer, or an ink layer.

The adhesive layer may have an adhesive force of, for example, 50 g/25 mm or more. The adhesive force may be measured according to, for example, JIS Z 0237:2009.

In addition, as the hard coat layer, any hard coat layer that is not exfoliated by a rub-off test.

In addition, the ink layer may have high adhesiveness to the substrate. The adhesiveness to the substrate may be measured by, for example, observing a peeled-off state of ink after adhering a cellophane adhesive tape to the ink layer and detaching the tape therefrom.

Light Diffusion Film

A light diffusion film according to an embodiment includes at least one layer selected from a light diffusion layer formed of the light-diffuser, an adhesive layer formed of the light diffusing adhesive, and a hard coat layer formed of the light diffusing hard coat member.

The light diffusion film may further include, for example, a substrate in addition to the light diffusion layer (light-diffuser). The light diffusion layer may be located on at least one surface of the substrate, directly or via another member. Particularly, the light diffusion layer may be located only one surface of the substrate directly or via another member.

The substrate is not particularly limited and any ones of the related art may be used. Among them, for example, a resin film may be used. This is because the resin film has excellent properties such as ease of handling and high transparency. The resin (polymer) constituting the resin film as a main component is not particularly limited and any ones of the related art may be used. Here, the term "film formed of the resin as a main component" mean that an amount of the polymer as a main component is 50% by mass or more based on a total mass of the resin film. The amount of the polymer as a main component may be, for example, 70% by mass or more, or 80% by mass or more based on the total mass of the resin film. In addition, the amount of the polymer may be, for example, in the range of 90 parts by mass to 100 parts by mass or 95 parts by mass to 100 parts by mass (upper limit: 100 parts by mass).

The resin constituting the resin film is not particularly limited and any ones of the related art may be used. Among them, a cellulose-based polymer, a polyester-based polymer, or a (meth)acrylic polymer may be used, and particularly, a cellulose-based polymer may be used. In addition, a cellulose ester such as acetyl cellulose (e.g., diacetylcellulose and triacetylcellulose (TAC), acetylbutylcellulose, acetylpropionylcellulose, acetylbutylcellulose, and acetylbutylpropionylcellulose may be used. For example, TAC may be used. Accordingly, for example, a cellulose-based film, a cellulose ester film, or a TAC film may be used as the substrate.

A thickness of the substrate is not particularly limited, but may be in the range of 10 μm to 500 μm. In addition, the thickness of the substrate may be, for example, in the range of 20 μm to 200 μm or 40 μm to 100 μm.

In addition, the substrate may be, for example, a functional film including the resin film and a functional layer located on the resin film. The functional layer may be provided on only one surface of the resin film or both surfaces thereof, particularly, only one surface thereof. The functional layer is not particularly limited, but may be any ones of the related art such as an anti-reflection (AR) layer, an anti-glare (AG) layer, and a reverse-adhesive layer. Among them, the functional layer may be, for example, an AR layer. The substrate may be a TAC film having an AR layer (AR-TAC).

The light diffusion film may further include another member in addition to the light diffusion layer and the substrate. The member is not particularly limited and any ones of the related art widely used in the film industries may be used. The member may be, for example, an intermediate layer interposed between the light diffusion layer and the substrate and a peel-off film adhered to the surface of the light diffusion layer. Among them, the member may be, for example, a peel-off film. In addition, the intermediate layer or the peel-off film is not particularly limited and any ones of the related art may be used. The peel-off film is not particularly limited, but may be, for example, a peel-off polyethylene terephthalate (PET). Commercially available peel-off PET products are not particularly limited, but may be, for example, PET3811 manufactured by Lintec Co., Ltd.

A haze of the light diffusion film is not particularly limited as long as the light diffusion film has light diffusivity. To further improve light diffusivity, the haze may be, for example, 80% or more. In addition, the haze may be, for example, in the range of 90% to 100% or 95% to 100%.

Total transmittance of the light diffusion film is not particularly limited as long as the light diffusion film transmits light in a proceeding direction of incident light. To further improve forward transmittance, the total transmittance may be, for example, in the range of 90% to 100%, 95% to 100%, or 99% to 100% or less.

Haze and total transmittance may be measured by an NDH5000 haze meter manufactured by Nippon Denshoku Kogyo Co., Ltd. In addition, experimental methods therefor will be described in detail in examples below.

A specular component included (SCI) reflectance of the light diffusion film measured by an SCI method is not particularly limited, but may be, for example, 1% or less in terms of visibility. In addition, the SCI reflectance may be, for example, 0.5% or less, 0.4% or less, or 0.3% or less (lower limit: 0%).

A specular component excluded (SCE) reflectance of the light diffusion film measured by an SCE method may be, for example, 0.8% or less, to further inhibiting backscattering. In addition, the SCE reflectance may be, for example, 0.5% or less, 0.3% or less, or 0.15% or less (lower limit: 0%).

The SCI reflectance and the SCE reflectance may be measured by using a CM-2600D spectrophotometer manufactured by Konica Minolta Corporation. In addition, experimental methods therefor will be described in detail in examples below.

When the light diffusion film includes an anisotropic light diffusion layer, a ratio of a value (%) in a direction where a highest luminous intensity is obtained at a varied-angle of 10° to a value (%) in a direction where a lowest luminous intensity is obtained at a varied angle of 10° (10° varied-angle luminous intensity ratio) may be, for example, 1.1 times or more to further improve anisotropic light diffusivity. In addition, the 10° varied-angle luminous intensity ratio may be, for example, 1.5 times or more, 2 times or more, or 2.2 times or more. The 10° varied-angle luminous intensity ratio may be measured by using a varied angle photometer (Goniometer) GP-700 manufactured by Nippon Denshoku Kogyo Co., Ltd. In addition, a measuring method will be described in detail in examples below.

A method of preparing the light diffusion film is not particularly limited. However, for example, the method may include preparing a light-diffuser-forming coating solution, and forming a light-diffuser on a substrate or peel-off film, as a support, using the light-diffuser-forming coating solution. In this regard, when the substrate is a resin film provided with a functional layer on only one surface thereof, the light-diffuser-forming coating solution may be coated on the other surface opposite to the functional layer. In addition, for example, a method of further adhering the substrate or peel-off film to a surface of a laminate of the light diffusion layer and the substrate or peel-off film via an adhesive member such as an adhesive sheet may be used. The adhesive sheet is not particularly limited, but may be, for example, CS9861 manufactured by Nitto Denco Corporation.

Figure 5A:
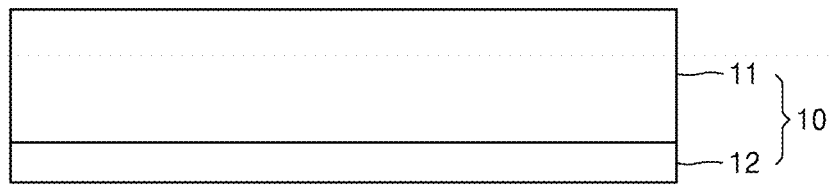
FIG. 5A is a schematic cross-sectional view of a light diffusion film according to an embodiment.

FIG. 5A is a schematic cross-sectional view of a light diffusion film 10 according to an embodiment. Here, the light diffusion film 10 includes: a substrate 11; and a light-diffuser-containing layer 12 located on one surface of the substrate 11. The light diffusion film 10 provides a light diffusing function to, for example, a display device by including the above-described light-diffuser-containing layer 12. The light-diffuser-containing layer 12 may be, for example, a light diffusion layer, an adhesive layer, a hard coat layer, or an ink layer. The light-diffuser-containing layer 12 has a single-layered structure.

Figure 5B:
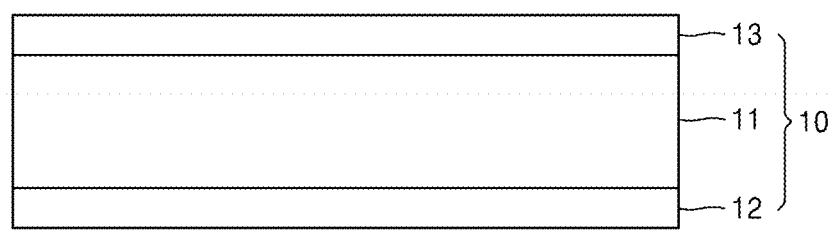
FIG. 5B is a schematic cross-sectional view of a light diffusion film according to an embodiment.

FIG. 5B is a schematic cross-sectional view of a light diffusion film 10 according to an embodiment. Here, the light diffusion film 10 includes: a substrate 11; a light-diffuser-containing layer 12 located on one surface of the substrate 11; and a functional layer 13 located on the other surface of the substrate 11. Although not shown in the drawing, the functional layer 13 may be located on both surfaces of the substrate 11. The functional layer 13 may be, for example, an anti-reflection (AR) layer.

Figure 6A:
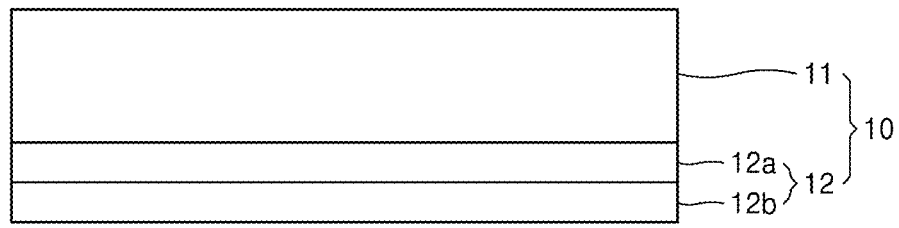
FIG. 6A is a schematic cross-sectional view of a light diffusion film according to an embodiment.

FIG. 6A is a schematic cross-sectional view of a light diffusion film 10 according to an embodiment. Here, the light diffusion film 10 includes: a substrate 11; and a light-diffuser-containing layer 12 located on one surface of the substrate 11. The light-diffuser-containing layer 12 includes a first light-diffuser-containing layer 12a and a second light-diffuser-containing layer 12b. The light-diffuser-containing layer 12 has a double-layered structure as the multi-layered structure. The first light-diffuser-containing layer 12a and the second light-diffuser-containing layer 12b may each independently be a light diffusion layer, an adhesive layer, a hard coat layer, or an ink layer. The light-diffuser-containing layer 12 may have, for example, a double-layered structure such as a light diffusion layer/adhesive layer structure, a light diffusion layer/hard coat layer structure, a light diffusion layer/ink layer structure, a first light diffusion layer/second light diffusion layer structure, or a first adhesive layer/second adhesive layer structure, i.e., a double-layered structure including the first light-diffuser-containing layer 12a and the second light-diffuser-containing layer 12b.

Figure 6B:
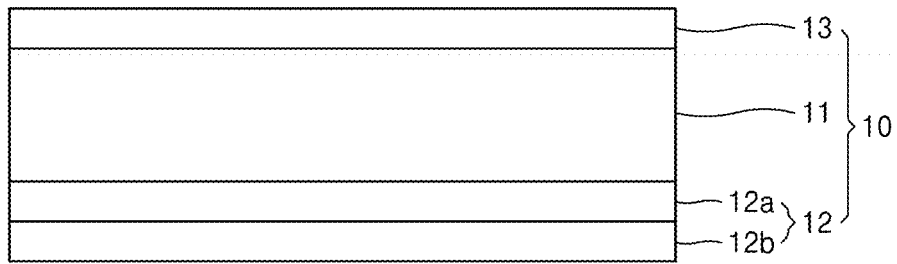
FIG. 6B is a schematic cross-sectional view of a light diffusion film according to an embodiment.

FIG. 6B is a schematic cross-sectional view of a light diffusion film 10 according to an embodiment. Here, the light diffusion film 10 includes: a substrate 11; a light-diffuser-containing layer 12 located on one surface of the substrate 11; and a functional layer 13 located on the other surface of the substrate 11. The light-diffuser-containing layer 12 includes a first light-diffuser-containing layer 12a and a second light-diffuser-containing layer 12b. Although not shown in the drawing, the functional layer 13 may be located on both surfaces of the substrate 11. The functional layer 13 may be, for example, an anti-reflection (AR) layer.

Figure 7A:
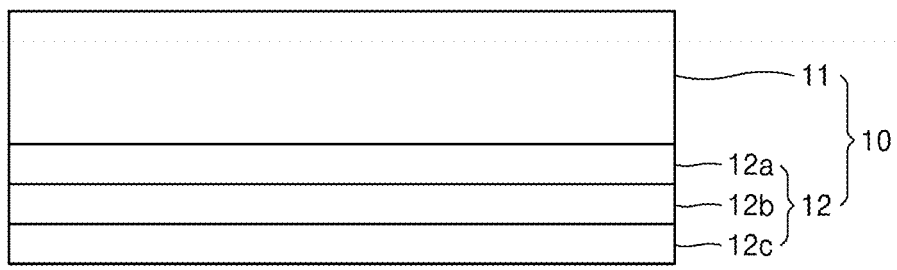
FIG. 7A is a schematic cross-sectional view of a light diffusion film according to an embodiment.

FIG. 7A is a schematic cross-sectional view of a light diffusion film 10 according to an embodiment. Here, the light diffusion film 10 includes: a substrate 11; and a light-diffuser-containing layer 12 located on one surface of the substrate 11. The light-diffuser-containing layer 12 includes a first light-diffuser-containing layer 12a, a second light-diffuser-containing layer 12b, and a third light-diffuser-containing layer 12c. The light-diffuser-containing layer 12 has a triple-layered structure as the multi-layered structure. Each of the first light-diffuser-containing layer 12a, the second light-diffuser-containing layer 12b, and the third light-diffuser-containing layer 12c may independently be a light diffusion layer, an adhesive layer, a hard coat layer, or an ink layer. The light-diffuser-containing layer 12 may have, for example, a triple-layered structure such as a light diffusion layer/adhesive layer/hard coat layer structure, a light diffusion layer/hard coat layer/ink layer structure, a light diffusion layer/ink layer/adhesive layer structure, a first light diffusion layer/second light diffusion layer/third light diffusion layer structure, or a first adhesive layer/second adhesive layer/third adhesive layer structure, i.e., a triple-layered structure including the first light-diffuser-containing layer 12a, the second light-diffuser-containing layer 12b, and a third light-diffuser-containing layer 12c.

Figure 7B:
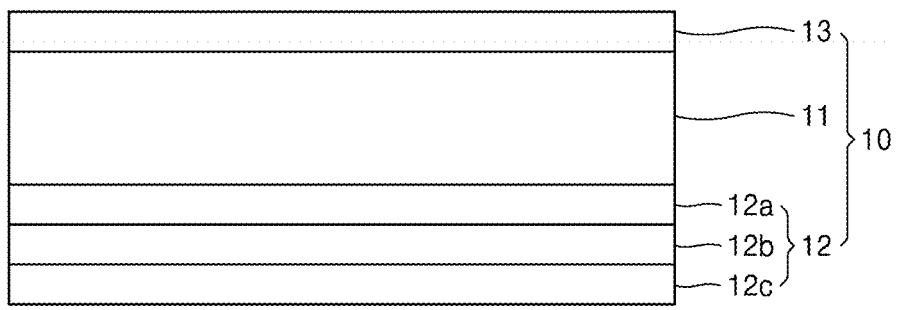
FIG. 7B is a schematic cross-sectional view of a light diffusion film according to an embodiment.

FIG. 7B is a schematic cross-sectional view of a light diffusion film 10 according to an embodiment. Here, the light diffusion film 10 includes: a substrate 11; a light-diffuser-containing layer 12 located on one surface of the substrate 11; and a functional layer 13 located on the other surface of the substrate 11. The light-diffuser-containing layer 12 includes a first light-diffuser-containing layer 12a, a second light-diffuser-containing layer 12b, and a third light-diffuser-containing layer 12c. Although not shown in the drawing, the functional layer 13 may be located on both surfaces of the substrate 11. The functional layer 13 may be, for example, an anti-reflection (AR) layer.

Although not shown in the drawing, the light-diffuser-containing layer 12 may have a multi-layered structure having 4 or more layers. In addition, although not shown in the drawing, the light diffusion film 10 may further include an intermediate layer, a peel-off film, or the like.

Display Device

A display device according to an embodiment includes the light diffusion film. According to this configuration, a wide viewing angle may be realized due to excellent light diffusivity obtained by the light diffusion film. In addition, backscattering of external light such as light of illumination is inhibited, thereby realizing high bright room contrast ratio.

The display device is not particularly limited and may be any related art display device, such as organic EL display devices or liquid crystal display devices may be used. In addition, in the display device according to an embodiment, the light diffusion film may be arranged, for example, on a view side.

Examples of the display device may include a liquid crystal display device having a structure in which the light diffusion film, a liquid crystal panel (polarizer/liquid crystal cell/polarizer), and a backlight unit are sequentially laminated from the view side. The light diffusion film may be arranged, for example, such that the AR-TAC faces the view side (where the AR layer is located only on the view side), and the light-diffuser faces the liquid crystal panel.

Figure 8A:
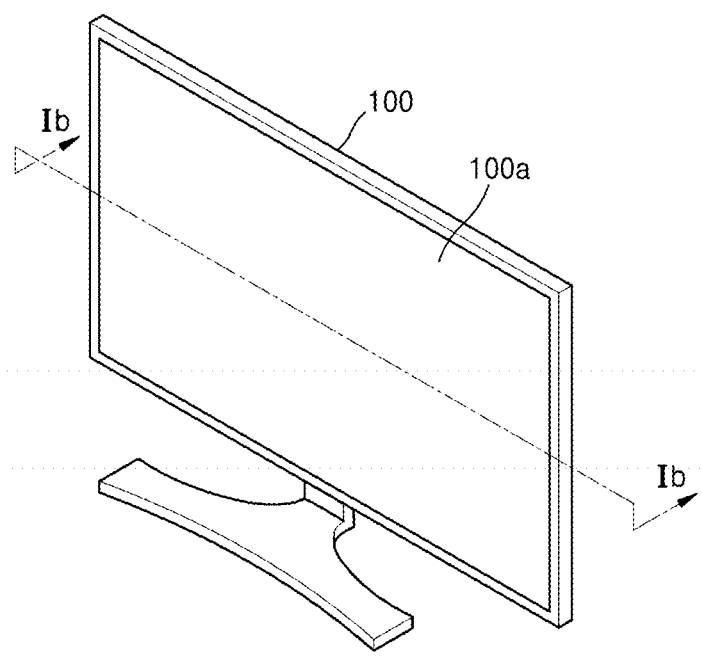
FIG. 8A is a schematic diagram of a display device according to an embodiment.

FIG. 8A is a schematic diagram of a display device according to an embodiment. The display device 100 displays an image on a display screen 100a. The display device 100 may be, for example, a liquid crystal TV, a liquid crystal display for personal computers (PCs), or a (portable) liquid crystal display. The display device 100 displays an image on the display screen 100a.

Figure 8B:
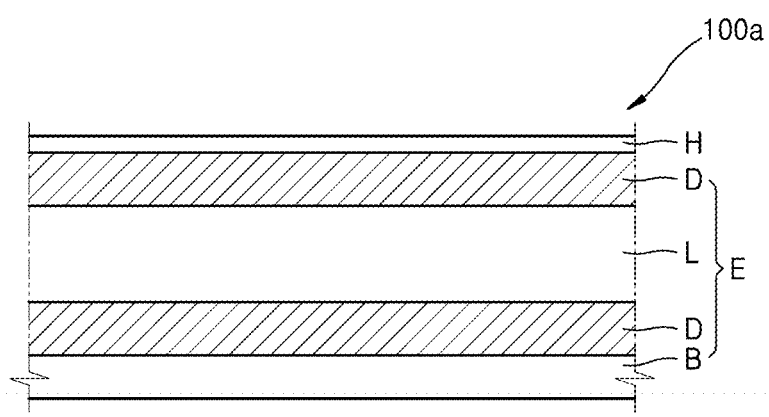
FIG. 8B is a schematic cross-sectional view of a display screen according to an embodiment, taken along line Ib-Ib of FIG. 8A.

FIG. 8B is a schematic cross-sectional view of the display screen 100a according to an embodiment, taken along line Ib-Ib of FIG. 8A.

The display screen 100a includes a liquid crystal panel E, as an example of a display element for displaying an image and a functional layer H formed on one surface thereof. The functional layer H includes the above-described light diffusion layer or light diffusion film.

As shown in the drawing, the liquid crystal panel E includes liquid crystals L, upper and lower polarizing films D respectively located on upper and lower surfaces of the liquid crystals L, and a backlight B located on a lower surface of the lower polarizing film D.

The upper and lower polarizing films D are examples of polarizers for polarizing light, and polarization directions thereof are orthogonal to each other. Each polarizing film D includes, for example, a resin film prepared by introducing oxo compound molecules into poly-vinyl alcohol (PVA). In addition, the polarizing film is formed by interposing the resin film between resin films formed of TAC. Light is polarized by oxo compound molecules included therein. Also, the backlight B may be, for example, a cold cathode fluorescent lamp or a white light emitting diode (LED), but is not limited thereto, and any light sources commonly used in the art as the backlight may also be used.

A power source is connected to the liquid crystals L, and an alignment direction of the liquid crystals L changes when a voltage is applied by the power source. When light is emitted from the backlight B, the light is polarized while passing through the lower polarizing film D. When the liquid crystal panel E is a twisted nematic (TN)-type liquid crystal panel, the polarized light passes therethrough when a voltage is applied to the liquid crystals E. The upper polarizing film D having a different polarization direction from that of the lower polarizing film D blocks the polarized light. Meanwhile, when a voltage is not applied to the liquid crystals E, the polarization direction rotates by 90° due to functions of the liquid crystals E. Thus, the upper polarizing film D does not block the polarized light but transmits the polarized light. Thus, the light transmittance may be controlled depending on whether a voltage is applied to the liquid crystals E, and therefore an image may be displayed. A color image may also be displayed by using a color filter.

The effects of embodiments will be described using the following examples and comparative examples. However, these examples and comparative examples are not limiting.

Preparation of Light Diffusing Adhesive and Light Diffusion Film Including the Same Example 1

Based on solid contents, 99.8 parts by mass of an adhesive resin-containing solution including an acrylic prepolymer (acrylic (co)polymer) (SK-Dyne® 1435, manufactured by Soken Chemical & Engineering Co., Ltd.), 30 parts by mass of cross-linked styrene-methacrylic polymer particles (cross-linked styrene-methacrylate-based polymer particles, average diameter of primary particles: 5 μm, Ganzpearl® GSM0561S-1, manufactured by Aica Kogyo Co., Ltd.), used as transparent particles, and 0.2 parts by mass of an isocyanate-based hardener (Duranate® 24A-100, manufactured by Asahi Kasei Corporation) were mixed to prepare an adhesive layer-forming coating solution. Subsequently, the adhesive layer-forming coating solution was coated on a peel-off PET (PET3811, manufactured by Lintec Co., Ltd.) using an applicator such that a thickness of an adhesive was 50 μm after drying. Then, the adhesive was dried at 90° C. for 5 minutes to form an adhesive layer formed of a light diffusing adhesive (light-diffuser). Then, the adhesive layer of the obtained laminate of the adhesive layer and the peel-off PET was adhered to a TAC film of an AR-TAC film (TAC film having an anti-reflection (AR) layer on one surface) to prepare a peel-off PET light diffusion film sample 1-1.

In addition, materials used to form the adhesive layer in Example 1 are shown in Table 1 below.

TABLE 1

Materials Used to Form Adhesive Layer in Example 1

| | Main component | Product Name | Mass ratio (solid content) |
|---|---|---|---|
| Transparent resin (binder, surrounding materials) | acrylic prepolymer | SK-DYNE ® 1435 product of Soken Chemical & Engineering Co., Ltd. | 99.8 |
| Transparent particles | cross-linked styrene methacrylic polymer particles | Ganzpearl ® GSM0561S - 1, product of Aica Kogyo Co., Ltd. | 30 |
| Hardener | isocyanate-based resin | Duranate ® 24A - 100 product of Asahi Kasei Corporation | 0.2 |

Comparative Example 1

A peel-off PET light diffusion film sample 1-2 was prepared in the same manner as in Example 1, except that the type of the transparent particles was changed to cross-linked styrene-based polymer particles (average diameter of primary particles: 3.5 μm, Chemisnow® SX-350H, manufactured by Soken Chemical & Engineering Co., Ltd.).

In addition, materials used to form the adhesive layer in Comparative Example 1 are shown in Table 2 below.

TABLE 2

Materials Used to Form Adhesive Layer in Comparative Example 1

| | Main component | Product Name | Mass ratio (solid content) |
|---|---|---|---|
| Transparent resin (binder, surrounding materials) | Acrylic Prepolymer | SK-DYNE ® 1435 product of Soken Chemical & Engineering Co., Ltd. | 99.8 |
| Transparent particles | cross-linked styrene-based polymer particles | Chemisnow ® SX-350H, product of Soken Chemical & Engineering | 30 |
| Hardener | isocyanate-based resin | Duranate ® 24A-100 product of Asahi Kasei Corporation | 0.2 |

Preparation of Light Diffusing Hard Coat Member and Light Diffusion Film Including the Same Example 2

Based on solid contents, 98.0 parts by mass of a hard coat resin-containing solution including a methacrylate-based prepolymer (methacrylate-based (co)polymer) (S-7187, manufactured by Toyokemu Co., Ltd.), 35 parts by mass of cross-linked styrene-methacrylic polymer particles (cross-linked styrene-methacrylate-based polymer particles, average diameter of primary particles: 5 μm, Ganzpearl® GSM0561S-1, manufactured by Aica Kogyo Co., Ltd.), as transparent particles, and 0.2 parts by mass of an isocyanate-based hardener (Duranate® 24A-100, manufactured by Asahi Kasei Corporation) were mixed to prepare a hard coat layer-forming coating solution. Subsequently, the hard coat layer-forming coating solution was coated on a TAC film of an AR-TAC film (having an anti-reflection (AR) layer on one surface thereof) using an applicator such that a thickness of the coating layer was 50 μm after drying. Then, the coating was dried at 60° C. for 10 minutes to form a hard coat layer formed of a light diffusing hard coat member (light-diffuser). According to the above-described process, a light diffusion film sample 2-1 was prepared.

Comparative Example 2

A light diffusion film sample 2-2 was prepared in the same manner as in Example 2, except that the type of the transparent particles was changed to cross-linked styrene-based polymer particles (average diameter of primary particles: 3.5 μm, Chemisnow® SX-350H, manufactured by Soken Chemical & Engineering Co., Ltd.).

Preparation of Light Diffusing Ink and Light Diffusion Film Including the Same

Example 3

Based on solid contents, 100 parts by mass of an ink resin-containing solution including a cellulose-based prepolymer and a hardener (ink for screen printing, IRX-HF medium, manufactured by Teikoku Printing Inks Mfg. Co., Ltd), and 100 parts by mass of cross-linked styrene-methacrylic polymer particles (cross-linked styrene-methacrylate-based polymer particles, average diameter of primary particles: 5 μm, Ganzpearl® GSM0561S-1, manufactured by Aica Kogyo Co., Ltd.) were mixed to prepare an ink for coating. Subsequently, the ink for coating was coated on a peel-off PET (PET3811, manufactured by Lintec Co., Ltd.) using an applicator such that a thickness of a coating layer was 25 μm after drying. Then, the coating layer was dried at 150° C. for 30 minutes to form an ink layer formed of a light-diffuser. Then, the ink layer of the obtained laminate of the ink layer and the peel-off PET was adhered to a TAC film of an AR-TAC film (TAC film having an anti-reflection (AR) layer on one surface) using an adhesive sheet (CS9861, manufactured by Nitto Denco Corporation) to prepare a peel-off PET light diffusion film sample 3-1.

In addition, for an adhesiveness test which will be described below, the prepared ink for coating was coated on a reverse-adhesive PET (COSMOSHINE® A4300, 75 μm, manufactured by Toyobo company) and dried under the same conditions as those of the preparation of the peel-off PET light diffusion film sample 3-1 to prepare a sample for adhesiveness test.

Comparative Example 3

A peel-off PET light diffusion film sample 3-2 was prepared in the same manner as in Example 3, except that the type of the transparent particles was changed to cross-linked styrene-based polymer particles (average diameter of primary particles: 3.5 μm, Chemisnow® SX-350H, manufactured by Soken Chemical & Engineering Co., Ltd.).

In addition, for an adhesiveness test which will be described below, the prepared ink for coating was coated on the reverse-adhesive PET (COSMOSHINE® A4300, 75 μm, manufactured by Toyobo company) and dried under the same conditions as those of the preparation of the peel-off PET light diffusion film sample 3-2 to prepare a sample for adhesiveness test.

Preparation of Anisotropic Light Diffusing Hard Coat Member

Example 4

Based on solid contents, 100 parts by mass of a hard coat resin-containing solution including a methacrylate-based prepolymer (methacrylate-based (co)polymer) (S-7187, manufactured by Toyokemu Co., Ltd.) and 100 parts by mass of cross-linked methyl methacrylate-based polymer particles (average diameter of primary particles: 4 μm, Ganzpearl® GM0449S-2, manufactured by Aica Kogyo Co., Ltd.), used as transparent particles, were mixed to prepare a hard coat layer-forming coating solution. Subsequently, the hard coat layer-forming coating solution was coated on a peel-off PET (PET3811, manufactured by Lintec Co., Ltd.) using an applicator such that a thickness of a coating layer was 35 μm after drying. Then, the coating layer was dried at 60° C. for 10 minutes to form a hard coat layer formed of a light diffusing hard coat member (light-diffuser). As described above, a laminate sample of the peel-off PET and the hard coat layer was formed.

Subsequently, the obtained laminate sample was cut to a width of 5 cm and a length of 7 cm. After removing the peel-off PET, the sample was attached to a stretching jig to a length of 5 cm with upper and lower margins of 1 cm, respectively. While the surface of the sample was heated to 150° C., the sample was subjected to fixed-end uniaxial stretching to a length of 12.5 cm to obtain a hard coat layer formed of an anisotropic light diffusing hard coat member. The stretched hard coat layer was adhered to a TAC film of an AR-TAC film (TAC film having an anti-reflection (AR) layer on one surface) using an adhesive sheet (CS9861, manufactured by Nitto Denco Corporation) to prepare a light diffusion film sample 4.

Evaluation

Average Diameter of Primary Particles of Transparent Particles

The average diameter of primary particles of transparent particles used in each of the examples and comparative examples was obtained by measuring diameters of 100 primary particles from a SEM image and calculating an average thereof Glass Transition Temperature Tg of Transparent Resin Transparent resin layer-forming coating solutions were prepared as follows.

Transparent resin layer-forming coating solutions were prepared in the same manner as in the preparation of the adhesive layer-forming coating solutions according to Example 1 and Comparative Example 1, except that the transparent particles were not added thereto.

In addition, transparent resin layer-forming coating solutions were prepared in the same manner as in the preparation of the hard coat layer-forming coating solutions according to Example 2 and Comparative Example 2, except that the transparent particles were not added thereto.

In addition, transparent resin layer-forming coating solutions were prepared in the same manner as in the preparation of the inks for coating according to Example 3 and Comparative Example 3, except that the transparent particles were not added thereto.

In addition, a transparent resin layer-forming coating solution was prepared in the same manner as in the preparation of the hard coat layer-forming coating solution according to Example 4, except that the transparent particles were not added thereto.

Subsequently, each of the obtained transparent resin layer-forming coating solutions was coated on a peel-off PET (PET3811, manufactured by Lintec Co., Ltd.) using an applicator such that a thickness of a coating layer was 50 μm after drying. Then, the coating layer was dried at 60° C. for 10 minutes to form a transparent resin layer on the peel-off PET.

Then, the peel-off PET was removed to obtain only the transparent resin, and a glass transition temperature Tg of the transparent resin was measured using a differential scanning calorimeter (DSC).

The glass transition temperature Tg of the transparent resin formed from the SK-Dyne® 1435, manufactured by Soken Chemical & Engineering Co., Ltd. and used in Example 1 and Comparative Example 1 was −45° C.

In addition, the glass transition temperature Tg of the transparent resin formed from the S-7187, manufactured by Toyokemu Co., Ltd. and used in Example 2 and Comparative Example 2 was 30° C.

In addition, the glass transition temperature Tg of the transparent resin formed from the IRX-HF medium, manufactured by Teikoku Printing Inks Mfg. Co., Ltd. and used in Example 3 and Comparative Example 3 was 150° C.

Refractive Index of Transparent Particles and Transparent Resin

For the transparent resin, the transparent resin layer-forming coating solutions were prepared in the same manner as in the measurement of the glass transition temperature Tg and transparent resin layers were obtained using the coating solutions. In addition, the transparent particles identical to those of the examples and comparative examples were prepared.

Then, refractive indices of the transparent resins were measured by a dispersion method.

Here, the refractive index of the transparent resin formed of the SK-Dyne® 1435, manufactured by Soken Chemical & Engineering Co., Ltd. and used in Example 1 and Comparative Example 1 was 1.48.

In addition, the refractive index of the transparent resin formed of the S-7187, manufactured by Toyokemu Co., Ltd. and used in Example 2 and Comparative Example 2 was 1.49.

In addition, the refractive index of the transparent resin formed o the IRX-HF medium, manufactured by Teikoku Printing Inks Mfg. Co., Ltd. and used in Example 3 and Comparative Example 3 was 1.49.

Subsequently, refractive indices of the transparent particles were measured according to a dispersion method.

Here, the refractive index of the transparent particles Ganzpearl® GSM0561S-1 manufactured by Aica Kogyo Co., Ltd. used in Example 1 to 3 was 1.54.

In addition, the refractive index of the transparent particles Chemisnow® SX-350H, manufactured by Soken Chemical & Engineering Co., Ltd. used in Comparative Examples 1 to 3 was 1.59.

In addition, the refractive index of the transparent particles Ganzpearl® GM0449S-2 manufactured by Aica Kogyo Co., Ltd. used in Example 4 was 1.50.

Anisotropy and Orientation of Transparent Particles

The light diffusion film sample 4 according to Example 4 was observed to evaluate whether the transparent particles had anisotropy and anisotropic particles are oriented in the stretching direction via using a SEM. In this regard, it was confirmed that the anisotropic particles are aligned such that the major axis directions thereof are oriented in approximately one direction in the light diffusion layer formed of the light-diffuser of the light diffusion film sample 4.

In addition, the degree of anisotropy obtained by the shape and orientation of the transparent particles may be determined by using a Goniometer by changing a measurement axis of the light diffusion film sample which will be described below.

Compatible State

SEM images of cross-sections of the obtained light diffusion film samples in the thickness direction were observed using a SEM.

In this regard, when fine irregularities are identified on the surfaces of the transparent particles and the interfaces between the transparent resin of the binder and the transparent particles are not clearly distinguished in the SEM images of the cross-sections of the light-diffusers, it was determined that only the outer perimeter portions of the transparent particles are in a compatible state with the transparent resin in the vicinity of the transparent particles.

When the surfaces of the transparent particles are smooth and the interfaces between the transparent resin of the binder and the transparent particles are clearly distinguished in the SEM images of the cross-sections of the light-diffusers, it was determined that the outer perimeter portions of the transparent particles are in an incompatible state with the transparent resin in the vicinity of the transparent particles.

Figure 1B:
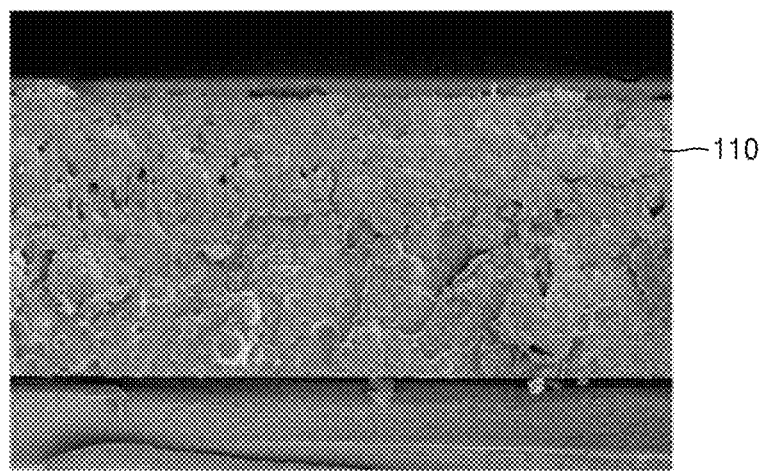
FIG. 1B is a SEM image of a cross-section of the light diffusion film sample 1-1 according to Example 1 of an embodiment in a thickness direction, illustrating a portion of a light-diffuser.

As an example of the compatible state between only the outer perimeter portions of the transparent particles and the transparent resin in the vicinity of the transparent particles, SEM images 100 and 110 of the light diffusion film sample 1-1 according to Example 1 are shown in FIGS. 1A and 1B. In this evaluation, SEM images of the light diffusion film samples 2-1, 3-1, and 4 illustrating the same property were able to be obtained. As such, it was confirmed that only the outer perimeter portions of the transparent particles were compatibilized with the transparent resin in the vicinity of the transparent particles in the light-diffusers of the light diffusion film samples 1-1, 2-1, 3-1, and 4 according to Examples 1 to 4.

Figure 2A:
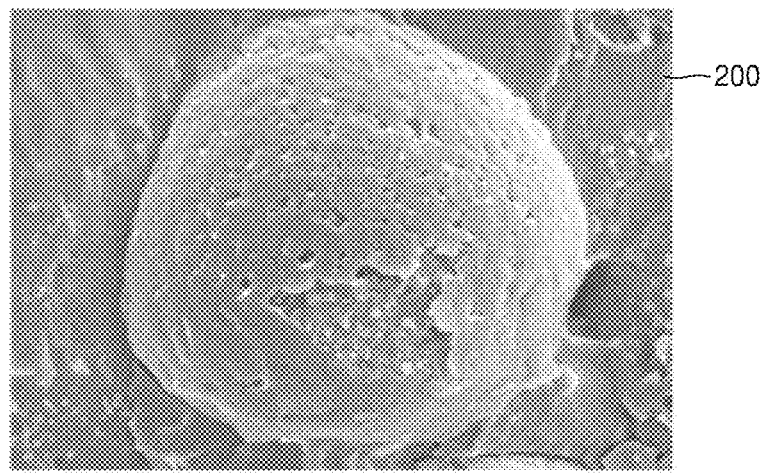
FIG. 2A is a SEM image of a cross-section of a light diffusion film sample 2-1 according to Comparative Example 1 of an embodiment in a thickness direction, illustrating an enlarged view of one transparent particle and a surrounding area thereof.
Figure 2B:
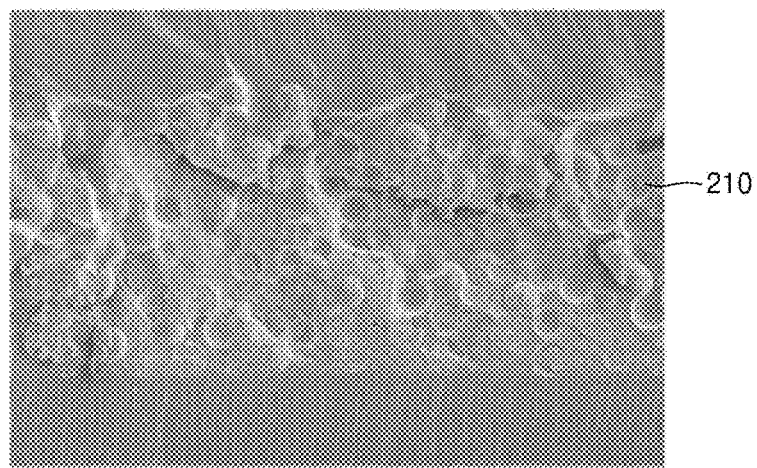
FIG. 2B is a SEM image of a cross-section of the light diffusion film sample 2-1 according to Comparative Example 1 of an embodiment in a thickness direction, illustrating a portion of a light-diffuser.

As an example of the incompatible state between the outer perimeter portions of the transparent particles and the transparent resin in the vicinity of the transparent particles, SEM images 200 and 210 of the light diffusion film sample 2-2 according to Comparative Example 2 are shown in FIGS. 2A and 2B. In this evaluation, SEM images of the light diffusion film samples 1-2 and 3-2 illustrating the same property were able to be obtained. As such, it was confirmed that the outer perimeter portions of the transparent particles were not compatibilized with the transparent resin in the vicinity of the transparent particles in the light-diffusers of the light diffusion film samples 1-2, 2-2, and 3-2 according to Comparative Examples 1 to 3.

Backscattering

Samples for measuring backscattering were prepared as follows.

After removing the peel-off PET from each of the peel-off PET light diffusion film samples 1-1 and 1-2, an adhesive surface of a black PET film (Kukkiri-mieru, manufactured by Tomoegawa Co., Ltd.) was adhered, using a roller, to the surface of the light diffusion layer (adhesive layer) from which the peel-off PET was removed to prepare samples for measurement.

An adhesive surface of a black PET film (Kukkiri-mieru, manufactured by Tomoegawa Co., Ltd.) was adhered, using a roller, to the surface of the light diffusion layer (hard coat layer) of each of the light diffusion film samples 2-1, 2-2, and 4 from which the peel-off PET was removed to prepare samples for measurement.

In addition, after removing the peel-off PET from each of the peel-off PET light diffusion film samples 3-1 and 3-2, an adhesive surface of a black PET film (Kukkiri-mieru, manufactured by Tomoegawa Co., Ltd.) was adhered, using a roller, to the surface of the light diffusion layer (ink layer) from which the peel-off PET was removed to prepare samples for measurement.

Subsequently, reflectance of the samples was measured using specular component included (SCI) and specular component excluded (SCE) methods by installing a spectrophotometer (CM-2600D manufactured by Konica Minolta Corporation) on the outer surface of the AR-TAC film. In addition, the SCI method is used to measure reflectance including specular reflectance among diffuse reflection components. In addition, the SCE method is used to measure reflectance excluding specular reflectance from diffuse reflection components. By using the measurement method, forward scattering components are absorbed by the black PET film and only a backscattering component may be measured.

Haze and Total Transmittance

After removing the peel-off PET from each of the peel-off PET light diffusion film samples 1-1 and 1-2, one surface of an alkali-free glass (EAGLE XG® manufactured by Corning Japan Co., Ltd.) was adhered to the surface of the light diffusion layer (adhesive layer) from which the peel-off PET was removed to prepare samples for measurement of haze and transmittance.

In addition, the light diffusion film samples 2-1, 2-2, and 4 were used as samples for measurement.

In addition, the light diffusion film samples 3-1 and 3-2 from which the peel-off PET was removed were used as samples for measurement.

Subsequently, the samples were installed in a measuring device (NDH5000 haze meter manufactured by Nippon Denshoku Kogyo Co., Ltd.) such that light was incident on the measuring device from the AR-TAC film side, and total transmittance and haze thereof were measured according to JIS K 7361-1:1997 and JIS K 7136:2000, respectively. In addition, by this measurement, transmittance of light and a ratio of scattered light excluding linearly transmitted light to the transmitted light may be identified.

Varied-Angle Luminous Intensity

The light diffusion film sample 4 was installed in a photometer (Goniometer, GP-700, manufactured by Nippon Denshoku Kogyo Co., Ltd.) and luminous intensity at 10° was measured. This measurement was performed under two conditions in which the stretching direction of the light-diffuser of the light diffusion film sample 4 was vertically set (vertical direction) and horizontally set (horizontal direction). The terms vertical and horizontal refers to directions perpendicular and parallel to a horizontal surface of the measuring device, respectively.

Light scattering, haze, total transmittance, SCI reflectance, SCE reflectance, luminous intensity at a varied-angle of 10° in the vertical stretching direction, and luminous intensity at a varied-angle of 10° in the horizontal stretching direction measured as described above are shown in Tables 3 to 6 below.

TABLE 3

Evaluation Method of Light Diffusion Film Sample Including Adhesive Layer

| Light diffusion film sample | Haze (%) | Total transmittance (%) | SCI (%) | SCE (%) | Note |
|---|---|---|---|---|---|
| 1-1 | 97 | 96 | 0.60 | 0.50 | Example 1 |
| 1-2 | 97 | 86 | 2.5 | 1.4 | Comparative Example 1 |

After removing the peel-off PET, tactile feeling of the surface of the adhesive layer was tested to evaluate the adhesive function. Thus, it was confirmed that both the light diffusion film samples 1-1 and 1-2 had adhesive properties and were able to be adhered to glass plates.

TABLE 4

Evaluation Method of Light Diffusion Film Sample Including Hard Coat Layer

| Light diffusion film sample | Haze (%) | Total transmittance (%) | SCI (%) | SCE (%) | Note |
|---|---|---|---|---|---|
| 2-1 | 97 | 98 | 0.30 | 0.23 | Example 2 |
| 2-2 | 97 | 97 | 1.5 | 1.0 | Comparative Example 2 |

The surface of the hard coat layer was tested using a rub-off test (firmly rubbing the surface of a resin) to evaluate the hard coat function. Thus, it was confirmed that the resins of both the light diffusion film samples 2-1 and 2-2 were not exfoliated.

TABLE 5

Evaluation Method of Light Diffusion Film Sample Including Ink Layer

| Light diffusion film sample | Haze (%) | Total transmittance (%) | SCI (%) | SCE (%) | Note |
|---|---|---|---|---|---|
| 3-1 | 96 | 99 | 0.33 | 0.12 | Example 3 |
| 3-2 | 97 | 97 | 0.75 | 0.54 | Comparative Example 3 |

After adhering a cellophane adhesive tape (Cellotape®, manufactured by Nichiban), using a 2 kg roller, to the surface of each of the ink layers of the prepared samples (samples having an ink layer on a reverse-adhesive PET) and detaching the cellophane adhesive tape for evaluation of close adhesion. Thus, it was confirmed that the ink layers of both the light diffusion film samples 3-1 and 3-2 were not peeled off

TABLE 6

Evaluation Result of Light Diffusion Film Sample Having Anisotropic Scattering Hard Coat Layer

| Light diffusion film sample | Haze (%) | Total transmittance (%) | SCI (%) | SCE (%) | Luminous intensity at varied-angle of 10° (stretching direction: vertical) | Luminous intensity at varied-angle of 10° (stretching direction: horizontal) | Note |
|---|---|---|---|---|---|---|---|
| 4 | 90 | 94 | 0.39 | 0.13 | 29 | 13 | Example 4 |

Based on the above results, it was confirmed that only the outer perimeter portions of the transparent particles were in a compatible state with the transparent resin in the vicinity of the transparent particles in the light-diffusers of the light diffusion film samples according to the examples. Meanwhile, it was confirmed that the outer perimeter portions of the transparent particles were in an incompatible state with the transparent resin in the vicinity of the transparent particles in the light-diffusers of the light diffusion film samples according to the comparative examples.

In addition, it was confirmed that the light diffusion film samples according to the examples of embodiments had high haze, sufficient light diffusivity, high light transmittance, low SCE reflectance, and low backscattering. Meanwhile, it was confirmed that the light diffusion film samples according to the comparative examples had high haze, sufficient light diffusivity, and high light transmittance but high SCE reflectance and high backscattering.

In addition, in the light diffusion film sample 4 according to the example of embodiments, the luminous intensity at the varied-angle of 10° in the vertical stretching direction was different from the luminous intensity at the varied-angle of 10° in the horizontal stretching direction. Accordingly, it was confirmed that the light diffusion film sample 4 has anisotropic light diffusivity and light passing through the light diffusion film sample 4 exhibited anisotropic scattering.

In addition, the light diffusion film samples according to the examples of embodiments and comparative examples were respectively located, after removing the peel-off PET in the case of using the peel-off PET, on a view side (opposite to the backlight side) of a commercially available display device such that an AR layer of the AR-TAC serves as the outer most layer of the view side. Then, image quality was observed in a bright room by turning on the backlight. As a result, it was confirmed whether a viewing angle was enlarged by the light diffusion film samples according to the examples of embodiments of embodiments and comparative examples.

Specifically, to digitize the enlarged viewing angles, color changes (Δu' v') were measured at every viewing angle in the commercially available liquid crystal display devices and the liquid crystal display devices including the light diffusion films of the examples of embodiments and the comparative examples. The color changes (Δu' v') at every viewing angle were obtained by measuring chromaticity (u', v') at every 10° in the horizontal direction with respect to the front of 0° using a spectroradiometer CS-2000A (manufactured by Konica Minolta Corporation), and calculating a difference between the measured chromaticity and a chromaticity at 0° (u'0, v'0). As a result, although the commercially available liquid crystal display devices exhibited a color difference (Δu' v') of 0.045 or more at a viewing angle around 70°, the liquid crystal display devices of the examples of embodiments exhibited an increased color difference (Δu' v') of 0.02 or less.

Figure 3:
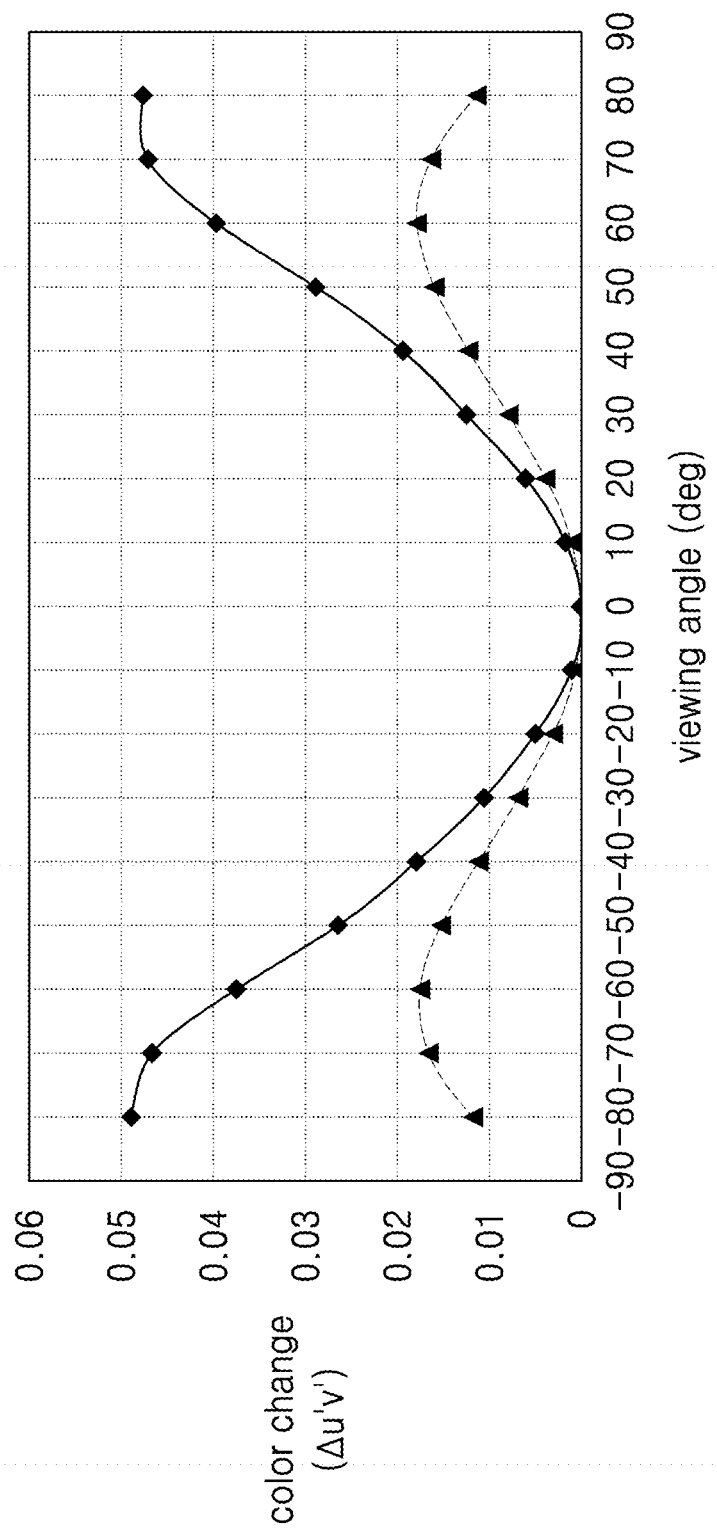
FIG. 3 is a graph illustrating the relationship between color change (Δu' v')-viewing angle of the liquid crystal display device including the light diffusion film sample 1-1 of Example 1 of an embodiment and a liquid crystal display device commercially available, as a comparative example.

The relationship between color change (Δu' v')-viewing angle of the liquid crystal display device including the light diffusion film sample 1-1 of Example 1 of embodiments and the liquid crystal display device commercially available in the art as a comparative example is shown in FIG. 3.

In addition, in the display device using the light diffusion film sample 4 according to Example 4, the light diffusion film sample 4 was arranged such that the orientation of the transparent particles is identical to the vertical direction of the screen of the display. In the display device according to embodiments, it was confirmed that the viewing angle was enlarged intensively in the horizontal direction.

In addition, it was confirmed that the display devices using the light diffusion film samples according to the examples of embodiments had higher bright room contrast ratios than that of the display devices using the light diffusion film samples according to the comparative examples.

As such, the light-diffusers and the light diffusion film samples using the same according to embodiments are suitable for films for enlarging viewing angles due to high haze, sufficient light diffusivity, and high transmittance. In addition, the light-diffuser and the light diffusion films using the same according to embodiments may perform anisotropic diffusion of light by using anisotropic particles as the transparent particles and orienting the transparent particles. Thus, it was confirmed that the light-diffuser and the light diffusion films using the same according to embodiments may intensively enlarge the viewing angle in a particular direction.

According to embodiments, backscattering may be sufficiently inhibited in the light-diffuser.

According to an embodiment, a method of producing a light-diffuser is provided. The method includes dispersing transparent particles in a transparent resin; treating the transparent particles and the transparent resin with a solvent so that some particles of the transparent resin infiltrate a portion of an outer periphery of each of the transparent particles to blur an interface between the transparent resin and each of the transparent particles, respectively, the portion extending from the interface toward a center of each of the transparent particles; and producing the light-diffuser including the transparent resin in which the transparent particles are dispersed. The portion of the outer periphery of each of the transparent particles remains mixed with the some particles of the transparent resin, thereby preventing backscattering, while the transparent resin has a refractive index different from that of the transparent particles.

Specifically, a refractive index $n_1$ of a center portion of each of the transparent particles, a refractive index $n_2$ of the transparent resin, and a refractive index $n_M$ of the portion of the outer periphery of each of the transparent particles, respectively, satisfy a relationship $n2<n_M<n_1$. The center portion is exclusive of the portion of the transparent particles that is infiltrated with the some particles of the transparent resin.

While embodiments of the disclosure have been particularly shown and described with reference to the drawings, the embodiments are provided for the purposes of illustration and it will be understood by one of ordinary skill in the art that various modifications and equivalent other embodiments may be made from the disclosure. Accordingly, the true technical scope of the disclosure is defined by the technical spirit of the appended claims.

What is claimed is:

1. A light-diffuser comprising:
  a transparent resin; and
  transparent particles dispersed in the transparent resin and formed of a first material different from the transparent resin,
  wherein the transparent resin has a refractive index that is different from a refractive index of the transparent particles,
  at least one portion at an outer perimeter of each of the transparent particles is compatibilized with the transparent resin disposed in a vicinity of each of the transparent particles, respectively,
  a second material of the at least one portion is formed by the first material infiltrated with the transparent resin,
  the transparent resin comprises a cured product of pre-polymer having a weight average molecular weight of 10,000 to 2,000,000, and
  surfaces of each of the transparent particles are included in the at least one portion.

2. The light-diffuser of claim 1, wherein the transparent particles comprise transparent cross-linked resin particles.

3. The light-diffuser of claim 1, wherein the transparent particles comprise at least one selected from a (meth)acrylic (co)polymer, a styrene-based (co)polymer, and a copolymer of a monomer comprising a (meth)acrylic monomer and a styrene-based monomer.

4. The light-diffuser of claim 1, wherein an average diameter of primary particles of the transparent particles is in a range of 500 nm to 50 µm.

5. The light-diffuser of claim 1, wherein the transparent particles comprise anisotropic particles.

6. The light-diffuser of claim 5, wherein the anisotropic particles are aligned such that major axis directions thereof are oriented in approximately one direction.

7. The light-diffuser of claim 1, wherein an amount of the transparent particles is in a range from 1 part by mass to 300 parts by mass, based on 100 parts by mass of the transparent resin.

8. The light-diffuser of claim 1, wherein the transparent resin comprises a thermoplastic resin selected from a cellulose-based polymer, a vinyl-based polymer, a (meth)acrylic polymer, a polystyrene-based polymer, a polyester-based polymer, or a polycarbonate-based polymer.

9. The light-diffuser of claim 1, wherein the transparent resin comprises a cured product of a resin precursor compound selected from a (meth)acrylic compound, an urethane-based compound, and an epoxy-based compound, and
  wherein the (meth)acrylic compound contains two or more (meth)acryloyloxy groups.

10. The light-diffuser of claim 1, wherein a glass transition temperature (Tg) of the transparent resin is in a range of −60° C. to 200° C.

11. The light-diffuser of claim 1, wherein the refractive index of the transparent resin is in a range of 1.35 to 1.8.

12. The light-diffuser of claim 1, wherein a refractive index difference between the transparent particles and the transparent resin, respectively, is in a range of 0.15 to 0.4.

13. The light-diffuser of claim 1, wherein a refractive index gradient exists among a refractive index $n_1$ of each of the transparent particles, a refractive index $n_2$ of the transparent resin, and a refractive index $n_M$ of surfaces of the transparent particles, respectively, and
  the surfaces are included in the at least one portion of the outer perimeter where the transparent particles and the transparent resin are in a compatibilized state.

14. The light-diffuser of claim 13, wherein the refractive index $n_1$ of each of the transparent particles, the refractive index $n_2$ of the transparent resin, and the refractive index $n_M$ of the surfaces of the transparent particles in the compatibilized state with the transparent resin satisfy a relationship $n_2<n_M<n_1$.

15. A light diffusion film comprising at least one selected from:
  a light diffusion layer formed of the light-diffuser according to claim 1,
  an adhesive layer formed of the light-diffuser according to claim 1, wherein the transparent resin is an adhesive, and
  a hard coat layer formed of the light-diffuser according to claim 1, wherein the transparent resin is a hard-coating resin.

16. The light diffusion film of claim 15, wherein a thickness of the light diffusion film is in a range from 1 µm to 500 µm.

17. The light diffusion film of claim 15, further comprising a substrate,
  wherein the substrate comprises a resin film comprising at least one selected from a cellulose-based polymer, a polyester-based polymer, and a (meth)acrylic polymer.

18. A display device comprising the light diffusion film according to claim 15.

19. The display device of claim 18, wherein the transparent particles comprise transparent cross-linked resin particles.

20. The display device of claim 18, wherein a refractive index gradient exists among a refractive index $n_1$ of each of the transparent particles, a refractive index $n_2$ of the transparent resin, and a refractive index $n_M$ of surfaces of the transparent particles, respectively, and
  the surfaces are included in the at least one portion of the outer perimeter where the transparent particles and the transparent resin are in a compatibilized state.

* * * * *